US012198296B2

(12) United States Patent
Chen

(10) Patent No.: US 12,198,296 B2
(45) Date of Patent: Jan. 14, 2025

(54) IMAGE PROCESSING METHOD, APPARATUS, DEVICE, AND COMPUTER-READABLE STORAGE MEDIUM

(71) Applicant: Tencent Technology (Shenzhen) Company Limited, Shenzhen (CN)

(72) Inventor: Fasheng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 345 days.

(21) Appl. No.: 17/735,942

(22) Filed: May 3, 2022

(65) Prior Publication Data

US 2022/0270207 A1 Aug. 25, 2022

Related U.S. Application Data

(63) Continuation of application No. PCT/CN2021/094049, filed on May 17, 2021.

(30) Foreign Application Priority Data

Jun. 3, 2020 (CN) .......................... 202010495781.1

(51) Int. Cl.
*G06T 3/4046* (2024.01)
*G06T 3/4053* (2024.01)
(Continued)

(52) U.S. Cl.
CPC .......... *G06T 3/4046* (2013.01); *G06T 3/4053* (2013.01); *G06T 5/20* (2013.01);
(Continued)

(58) Field of Classification Search
CPC ....... G06T 3/4046; G06T 3/4053; G06T 5/20; G06T 2207/10016; G06T 2207/20081; G06T 2207/20084; H04N 9/67
See application file for complete search history.

(56) References Cited

U.S. PATENT DOCUMENTS

| 10,582,205 B2 | 3/2020 | Wang et al. |
| 2007/0086627 A1 | 4/2007 | Kim |

(Continued)

FOREIGN PATENT DOCUMENTS

| CN | 104598908 A | 5/2015 |
| CN | 108062744 A | 5/2018 |

(Continued)

OTHER PUBLICATIONS

Y. Wang et al., "Lednet: A Lightweight Encoder-Decoder Network for Real-Time Semantic Segmentation," 2019 IEEE International Conference on Image Processing (ICIP), Taipei, Taiwan, 2019, pp. 1860-1864. (Year: 2019).*

(Continued)

*Primary Examiner* — John R Wallace
(74) *Attorney, Agent, or Firm* — Morgan, Lewis & Bockius LLP

(57) ABSTRACT

Embodiments of this application provide an image processing method, apparatus, device, and computer-readable storage medium. The method includes: obtaining an image; determining eigenvectors of pixels in the image and determining neighborhood image blocks corresponding to the pixels; processing the eigenvectors and the neighborhood image blocks of the pixels by using a lightweight neural network model, to obtain a target image after processing, the lightweight neural network model being obtained by performing lightweight processing on a trained neural network
(Continued)

model; and outputting the target image, wherein the target image has a higher resolution than that of the image.

20 Claims, 14 Drawing Sheets

(51) Int. Cl.
  *G06T 5/20* (2006.01)
  *H04N 9/67* (2023.01)
(52) U.S. Cl.
  CPC ..... *H04N 9/67* (2013.01); *G06T 2207/10016* (2013.01); *G06T 2207/10024* (2013.01); *G06T 2207/20081* (2013.01); *G06T 2207/20084* (2013.01)

(56) References Cited

U.S. PATENT DOCUMENTS

| | | |
|---|---|---|
| 2011/0176604 A1 | 7/2011 | Ozawa |
| 2019/0096049 A1 | 3/2019 | Kim et al. |
| 2019/0147350 A1 | 5/2019 | Bai et al. |
| 2019/0188539 A1* | 6/2019 | Lee .................. G06V 10/82 |
| 2019/0325293 A1 | 10/2019 | Wang et al. |
| 2020/0034948 A1 | 1/2020 | Park et al. |
| 2020/0082154 A1 | 3/2020 | Hussain et al. |
| 2021/0266496 A1* | 8/2021 | Qin .................. H04N 5/144 |

FOREIGN PATENT DOCUMENTS

| | | |
|---|---|---|
| CN | 109308679 A | 2/2019 |
| CN | 109598676 A | 4/2019 |
| CN | 109902720 A | 6/2019 |
| CN | 109949235 A | 6/2019 |
| CN | 110084108 A | 8/2019 |
| CN | 110136063 A | 8/2019 |
| CN | 110907732 A | 3/2020 |
| CN | 111105352 A | 5/2020 |
| CN | 111402143 A | 7/2020 |
| EP | 3499416 A1 | 6/2019 |
| JP | 2010093650 A | 4/2010 |

OTHER PUBLICATIONS

Y. Tang, X. Zhu and M. Cui, "Convolutional neural network with gradient information for image super-resolution," 2016 IEEE International Conference on Information and Automation (ICIA), Ningbo, China, 2016, pp. 1714-1719. (Year: 2016).*

Lanfeng Zhou et al., "A Review of Deep Learning for Single Image Super-Resolution", 2019 International Conference on Intelligent Informatics and Biomedical Sciences (ICIIBMS), IEEE, Nov. 21, 2019, XP033713192, 4 pgs.

Tencent Technology, Extended European Search Report and Supplementary Search Report, EP21817967.9, Jan. 5, 2023, 14 pgs.

Yinggan Tang et al., "Convolutional Neural Network with Gradient Information for Image Super-Resolution", 2016 IEEE International Conference on Information and Automation (ICIA), Aug. 1, 2016, XP033053641, 6 pgs.

Wang Yu et al., "LEDNET: A Lightweight Encoder-Decoder Network for Real-Time Semantic Segmentation", 2019 IEEE International Conference on Image Processing (ICIP), Sep. 22, 2019, XP033647079, 5 pgs.

Tencent Technology, Japanese Office Action, JP Application No. 2022566432, Oct. 30, 2023, 10 pgs.

Christian Ledig et al., "Photo-Realistic Single Image Super-Resolution Using a Generative Adversarial Network", 2017 IEEE Conference on Computer Vision and Pattern Recognition, 11 pgs.

Jingxu Chen et al., "Single Image Super-Resolution Based on Deep Learning and Gradient Transformation", 2016 IEEE 13$^{th}$ International Conference on Signal Processing, Chengdu, China, 6 pgs.

Taito Manabe et al., "FPGA Implementation of a Super-Resolution System", 2016 International Conference on Field-Programmable Technology, Xi'an, China, 7 pgs.

Zejiang Hou et al., "Efficient Image Super Resolution Via Channel Discriminative Deep Neural Network Pruning", 2020 IEEE International Conference on Acoustics, Speech and Signal Processing, Barcelona, Spain, 6 pgs.

Tencent Technology, WO, PCT/CN2021/094049, Aug. 16, 2021, 4 pgs.

Tencent Technology, IPRP, PCT/CN2021/094049, Dec. 6, 2022, 5 pgs.

Tencent Technology, ISR, PCT/CN2021/094049, Aug. 16, 2021, 2 pgs.

* cited by examiner

IMAGE PROCESSING METHOD, APPARATUS, DEVICE, AND COMPUTER-READABLE STORAGE MEDIUM

CROSS-REFERENCE TO RELATED APPLICATIONS

This application is a continuation application of PCT Patent Application No. PCT/CN2021/094049, entitled "IMAGE PROCESSING METHOD AND APPARATUS, DEVICE, AND COMPUTER READABLE STORAGE MEDIUM" filed on May 17, 2021, which claims priority to Chinese Patent Application No. 202010495781.1, filed with the State Intellectual Property Office of the People's Republic of China on Jun. 3, 2020, and entitled "IMAGE PROCESSING METHOD, APPARATUS, DEVICE, AND COMPUTER-READABLE STORAGE MEDIUM", all of which are incorporated herein by reference in their entirety.

FIELD OF THE TECHNOLOGY

Embodiments of this application relate to the technical field of image processing, and relate to, but are not limited to, an image processing method, apparatus, device, and computer-readable storage medium.

BACKGROUND OF THE DISCLOSURE

Image processing is a method and technology for image processing, such as noise removing, enhancing, restoring, and resolution improvement, by using a computer. With the continuous development of the computer science and technology and the digital technology, image processing is widely used in work, life, military, medicine, and other fields. Moreover, accompanied with the development of the artificial intelligence technology, a better processing effect can be achieved through machine learning during implementation of image processing.

At present, during image processing through machine learning, a neural network model used needs to be ensured to have layers that are deep enough, which results in a quite complex network structure and a huge amount of computation, and therefore, real-time processing cannot be implemented.

SUMMARY

Embodiments of this application provide an image processing method, apparatus, device, and computer-readable storage medium, which not only can ensure the coherence of pixels of a target image, but also can implement image processing in real time, thereby improving the efficiency of image processing.

Technical solutions of the embodiments of this application are implemented as follows:

An embodiment of this application provides an image processing method, performed by an image processing device, the method including:
obtaining an image;
determining eigenvectors of pixels in the image and determining neighborhood image blocks corresponding to the pixels when the image is a grayscale image;
processing the eigenvectors and the neighborhood image blocks of the pixels by using a lightweight neural network model, to obtain a target image after processing, the lightweight neural network model being obtained by performing lightweight processing on a trained neural network model; and
outputting the target image, wherein the target image has a higher resolution than that of the image.

An embodiment of this application provides a computer device, including:
a memory, configured to store executable instructions; and
a processor, configured to implement, when executing the executable instructions stored in the memory, the foregoing method.

An embodiment of this application provides a non-transitory computer-readable storage medium, storing executable instructions, the instructions when being executed by a processor causing the processor to implement the foregoing method.

The embodiments of this application have the following beneficial effects:

After obtaining an image, neighborhood image blocks corresponding to pixels in the image are determined; when the image is a grayscale image, eigenvectors of the pixels in the image are extracted; and the eigenvectors and the neighborhood image blocks of the pixels are processed by using a lightweight neural network model, to obtain a target image after processing, the lightweight neural network model being obtained by performing lightweight processing on a trained neural network model. The neural network structure is used in training and therefore a target image with coherent pixels can be guaranteed after various special losses are used, and the lightweight neural network model (for example, a subspace model or a decision tree) obtained through model conversion is used in image processing and therefore the model can run to output a target image in real time, thereby improving the efficiency of image processing while ensuring the processing effect.

DESCRIPTION OF EMBODIMENTS

Figure 1A:
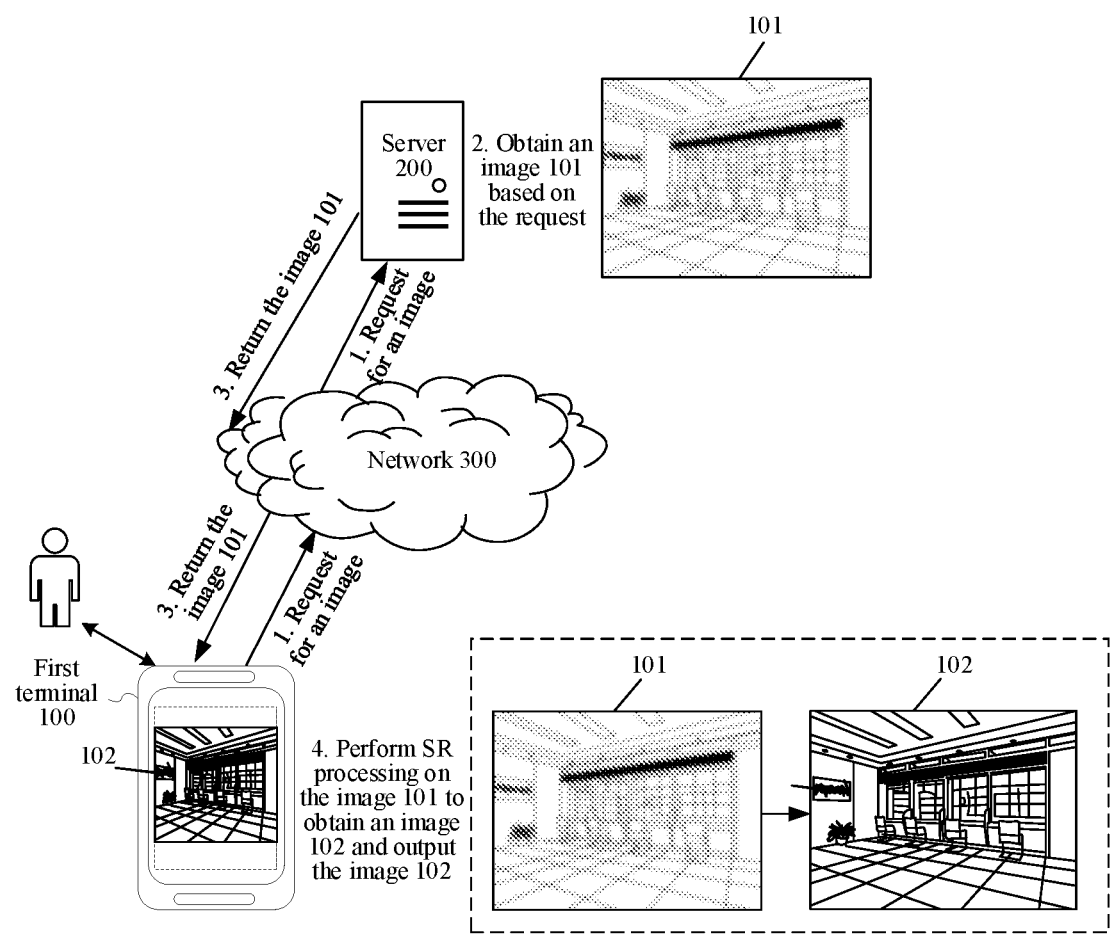
FIG. 1A is a schematic diagram of a network architecture of an image processing system according to an embodiment of this application.

To make the objectives, technical solutions, and advantages of this application clearer, the following describes the embodiments of this application with reference to the accompanying drawings. The described embodiments are not to be considered as a limitation to this application. All other embodiments obtained by a person of ordinary skill in the art without creative efforts shall fall within the protection scope of this application.

In the following description, "some embodiments" describe subsets of all possible embodiments, but it may be understood that the "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit the embodiments of this application.

Before the embodiments of this application are described in detail, a description is made on nouns and terms in the embodiments of this application, and the terms in the embodiments of this application are applicable to the following explanations.

1) Image processing: Processing on an image, that is, pixel image-to-pixel image processing, for example, processing such as super resolution, and image denoising or enhancement.

2) Super resolution (SR) algorithms: Algorithms capable of improving an image resolution, which may be referred to as SR algorithms for short and pertain to an image processing method. The super resolution algorithms may be grouped into two categories: multi-frame SRs and single-frame SRs. By a single-frame SR, one image is processed to obtain a super resolution image corresponding to the image. By a multi-frame super resolution algorithm, a plurality of images are processed to obtain a plurality of super resolution images corresponding to the plurality of images. This patent focuses on the single-frame super resolution algorithm. Among the single-frame super resolution algorithms, in particular, the method based on deep learning is the best (which is significantly better than the conventional method).

3) Computer central processing unit (CPU): A computer CPU is the core of operation and control of a computer system, is the final execution unit of information processing and program running, and can be used in various computing scenarios.

4) Graphics processing unit (GPU): A GPU is also known as a display core, a visual processor, or a display chip and is a microprocessor that specializes in image and graphics related operations on a personal computer, a workstation, a game console, and some mobile devices (for example, a tablet, a smartphone, and the like). Due to the strong computing power, a GPU is often far more powerful than a CPU and is therefore widely used in model inference in deep learning. Because GPU resources are scarce, there is a delay in deployment.

5) Deep learning (DL): Machine learning using a neural network.

6) Model conversion algorithm: An algorithm for converting the type of a model, for example, converting a deep learning network into a decision tree model or a subspace model, or the like. Through the model conversion algorithm, a complex model may be converted into a simple model, which greatly improves the calculation speed thereof (the disadvantage is that it may lead to a decrease in the accuracy).

7) Convolution kernel: During image processing, given an input image, pixels in a small area of the input image are weighted and averaged to form corresponding pixels in an output image, where a weight is defined by a function and the function is referred to as the convolution kernel.

8) Objective function: An objective function is also known as a loss function or a cost function, is a function that maps a value of a random event or a related random variable thereof to a non-negative real number to represent a "risk" or "loss" of the random event. During application, the objective function is usually associated with an optimization matter as a learning criterion, that is, the model is solved and evaluated by using a minimized objective function. For example, the objective function is used in parameter estimation of a model in statistics and machine learning, and is an optimization goal of a machine learning model.

9) Gamut: A gamut is also known as a color space, represents a color range that a color image can display. At present, a common gamut includes a luminance chrominance (YUV) gamut, a red green blue (RGB) gamut, a cyan magenta yellow black (CMYK) gamut, or the like.

To better understand the image processing method provided in this embodiment of this application, firstly, image processing methods used for improving the resolution in the related technologies and disadvantages thereof are explained.

In the related technologies, the image processing methods used for improving the resolution include at least the following two types:

First: Rapid and Accurate Super Image Resolution (RAISR).

The RAISR is a super resolution method based on an indexed filter. Simply, during inferencing, the RAISR follows the following steps:

Step S001: First enlarge an image to a target size.

Step S002: Calculate a gradient feature of each pixel in an enlarged image.

Step S003: Each pixel is indexed by using the gradient feature to a filter to be used (convolution kernel).

Step S004: Each pixel is convoluted with the filter indexed thereby, to obtain an SR pixel.

During implementation, by using the RAISR, three features calculated based on a gradient are used and each feature is divided into different paragraphs, to divide an eigenspace into a plurality of small blocks. In each eigensubspace (block), a target value may be fitted directly by using a minimum square method, to obtain a convolution kernel parameter. In this way, a high resolution-low resolution upsampled image pair may be constructed artificially, and then each image block is assigned to a different subspace according to gradient features of pixels in the upsampled image. In each subspace, the minimum square is used to fit the image block to a target pixel (a high resolution pixel) to train the model.

In the related technologies, there is also an optimized version based on the RAISR, which does not use the upsampling method, but uses upscaling of the deep learning, that is, $M^2$ (M is an amplification factor) convolution kernels are fitted during minimum square fit, to convert one image into $M^2$ channels and recombine, by using a pixel shuffling method, the $M^2$ channels to form a big image, so that the convolution kernel is bigger and the effect is better.

Compared with the deep learning methods, the effect of the RAISR methods is slightly decreased, but the calculation speed can be greatly increased (in the RAISR-related theses, the speed of the RAISR is more than 100 times that of the deep learning super resolution).

Second: Super Resolution Generative Adversarial Network (SRGAN).

The SRGAN is a super resolution technology based on a generative adversarial network. Generally, two networks are trained at the same time by using characteristics of a generative adversarial network, one is a generation network for constructing a more real high resolution image generation network, and the other one discrimination network for determining whether an input high resolution image is a discrimination network constructed by an algorithm. The two networks are trained by using two objective functions. By training the two networks alternately, the performance of the two networks becomes stronger and stronger. Finally, the generation network is taken out and used in inferencing. In addition, a content loss may be added to the objective function of the generation network, to calculate a distance loss between the SR image and the real high resolution image at a feature level (features are extracted through a network composed of first N layers of an object recognition network such as a VGG). Through the content loss, the trained generation network can enable the constructed super resolution image to have more random details and make the image better.

The disadvantage of the algorithms such as the RAISR is that: filters (convolution kernels) need to be trained in different subspaces respectively, and therefore when various special losses (for example, the content loss) in deep learning are added, it is difficult to ensure the continuity of adjacent pixels, resulting in noise.

The disadvantage of the algorithms such as the SRGAN is that: the network needs to be deep enough, and therefore the network structure is usually complex, and it is difficult to run in real time like the RAISR.

On the basis of the above, this embodiment of this application provides a method in which a deep learning solution for image processing is combined with matched model acceleration (model conversion). A neural network structure is used in training to ensure the coherence of output pixels when various special losses are used, and to ensure that no additional noise is introduced. In addition, through the method for model conversion, the model is simplified to a lightweight neural network model (for example, a subspace model or a decision tree), so that the model can run in real time.

The following is an exemplary application of the image processing device provided in this embodiment of this application. The image processing device provided in this embodiment of this application may be implemented as any terminal having a screen display function, such as a laptop, a tablet, a desktop computer, a mobile device (for example, a mobile phone, a portable music player, a personal digital assistant, a dedicated messaging device, or a potable game device), an intelligent TV set, or an intelligent robot or may be a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

FIG. 1A is a schematic diagram of a network architecture of an image processing system according to an embodiment of this application. As shown in FIG. 1A, the image processing system includes a first terminal 100, a server 200, and a network 300. To support an exemplary application, the first terminal 100 is connected to the server 200 through the network 300. The first terminal 100 may be an intelligent terminal on which a variety of applications (Apps), such as a video watching App, an instant messaging App, a shopping App, or an image acquisition App, may be installed. The network 300 may be a wide area network or a local area network, or a combination of a wide area network and a local area network, and implements data transmission by using a wireless link.

In a case that a user watches a video through the first terminal 100, or when a user views an image on a webpage, the first terminal 100 may request to obtain the video or the image from the server 200 (in this embodiment, for example, an image 101 is obtained for description). The image processing method provided in this embodiment of this application may be integrated in an image library App of the first terminal 100 as a functional plug-in. If the first terminal 100 starts the image processing function, the first terminal 100 may process, by using the image processing method provided in this embodiment of this application, the image 101 obtained from the server 200 in real time, to obtain a processed image 102 and display the processed image 102 in a display interface of the first terminal 100. For example, SR processing is performed on the image in FIG. 1A for description. By comparing 101 and 102 in FIG. 1A, the processed image 102 has a higher resolution, so that the image quality experience of the user can be improved while a code rate code stream is kept unchanged.

Figure 1B:
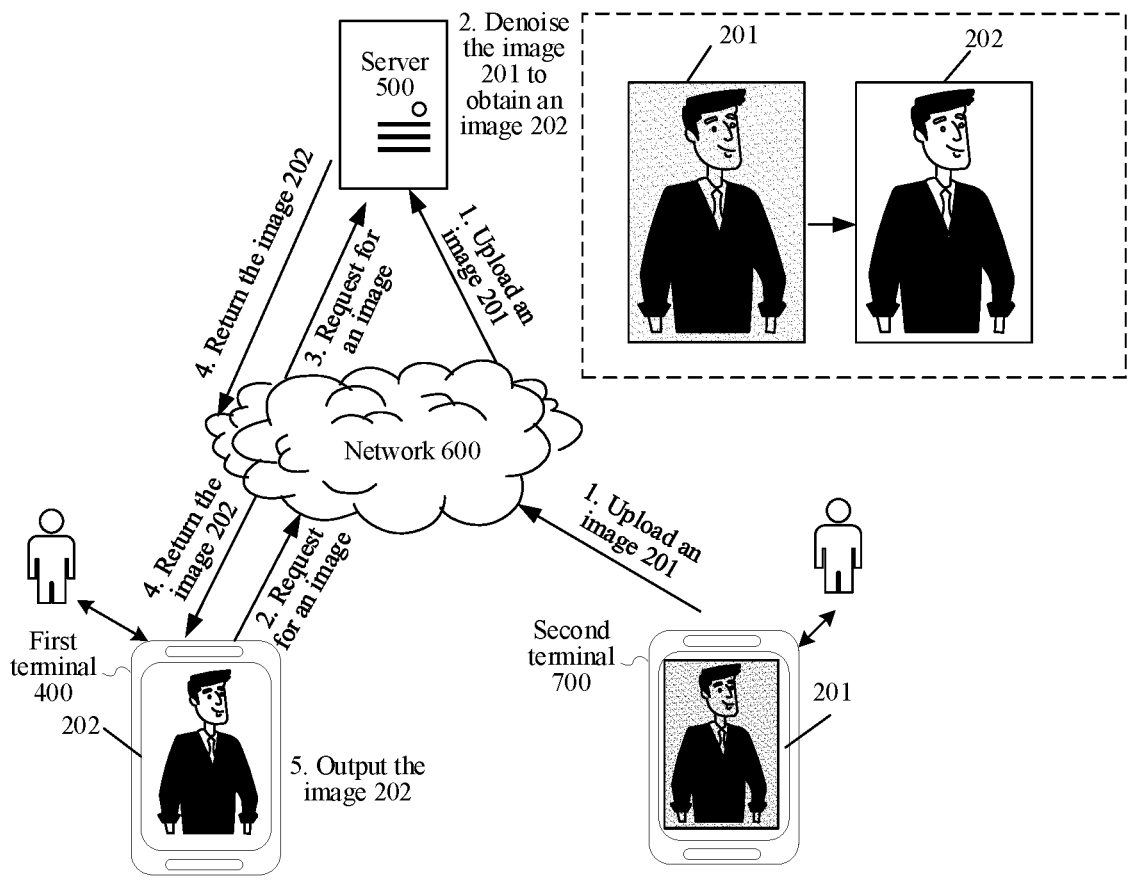
FIG. 1B is a schematic diagram of another network architecture of an image processing system according to an embodiment of this application.

FIG. 1B is a schematic diagram of another network architecture of an image processing system according to an embodiment of this application. As shown in FIG. 1B, the image processing system includes a first terminal 400, a second terminal 700, a server 500, and a network 600. To support an exemplary application, the first terminal 400 is connected to the server 500 through the network 600. The first terminal 400 may be an intelligent terminal on which a variety of applications (Apps), such as a video watching App, an instant messaging App, a shopping App, or an image acquisition App, may be installed. The network 600 may be a wide area network or a local area network, or a combination of a wide area network and a local area network, and implements data transmission by using a wireless link.

The second terminal 700 may also be any terminal having a screen display function, such as a laptop, a tablet, a desktop computer, a mobile device (for example, a mobile phone, a portable music player, a personal digital assistant, a dedicated messaging device, or a potable game device), an intelligent TV set, or an intelligent robot. The second terminal 700 may upload a file of an image or video to the server 500, which after receiving the image or video uploaded by the second terminal 700 may process the image or the video according to the image processing method provided in this embodiment of this application to obtain a processed image or video, and when the first terminal 400 requests for the image or video from the server 500, the server 500 may return the processed image or video to the first terminal 400, which displays the processed image or video in a display interface of the first terminal 400, so that the image quality experience of the user is improved. In FIG. 1B, for example, an image is denoised for description. An image 201 in FIG. 1B is a raw image, and an image 202 in FIG. 1B is a processed image. By comparing the image 201 and image 202, there is almost no noise in the processed image. Therefore, the image quality experience of the user is improved.

Figure 2:
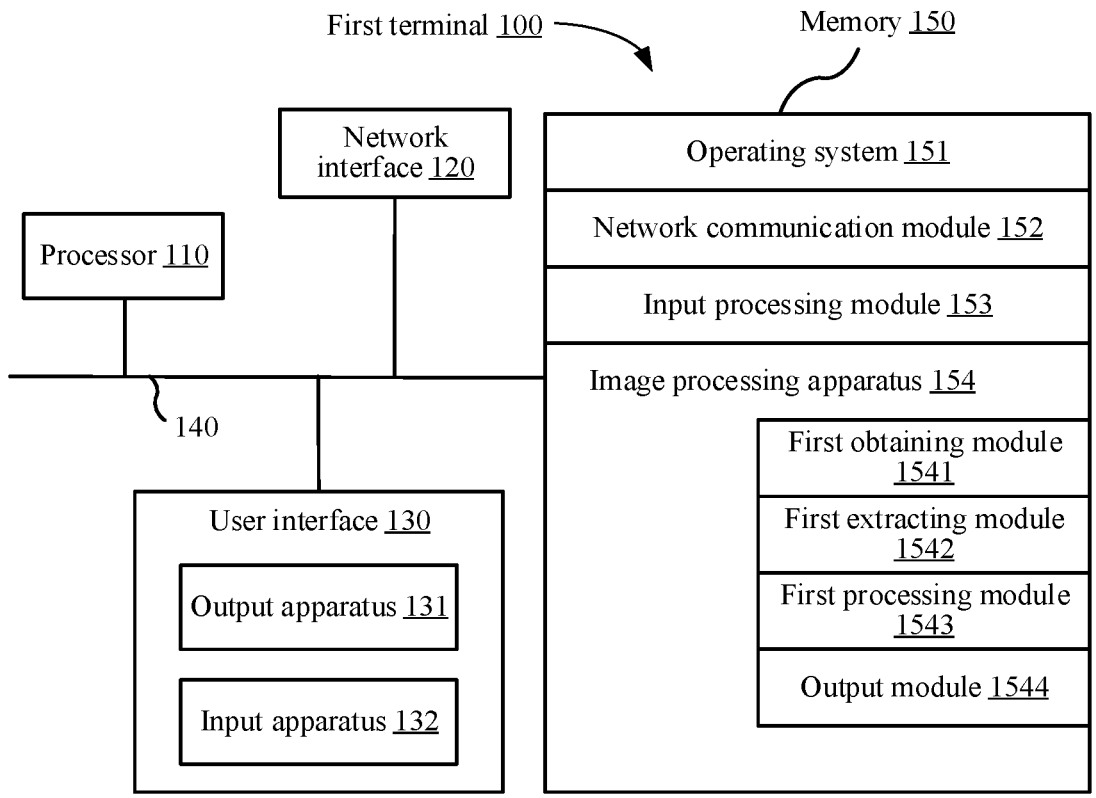
FIG. 2 is a schematic structural diagram of a first terminal 100 according to an embodiment of this application.

FIG. 2 is a schematic structural diagram of a first terminal 100 according to an embodiment of this application. The first terminal 100 shown in FIG. 2 includes: at least one processor 110, a memory 150, at least one network interface 120, and a user interface 130. All the components in the first terminal 100 are coupled together by a bus system 140. It may be understood that the bus system 140 is configured to implement connection and communication between the components. In addition to a data bus, the bus system 140 further includes a power bus, a control bus, and a status signal bus. However, for ease of clear description, all types of buses are labeled as the bus system 140 in FIG. 2.

The processor 110 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The user interface 130 includes one or more output apparatuses 131 that enable media content to be presented, including one or more speakers and/or one or more visual displays. The user interface 130 also includes one or more input apparatuses 132, including a user interface component that facilitates user input, such as a keyboard, a mouse, a microphone, a touch screen display, a camera, or other input buttons and controls.

The memory 150 may be removable, non-removable, or a combination thereof. Exemplary hardware devices include a solid state memory, a hard disk drive, an optical disc drive, and the like. The memory 150 may include one or more storage devices located physically away from the processor 110.

The memory 150 includes a volatile memory or a non-volatile memory, or may include a volatile memory and a non-volatile memory. The non-volatile memory may be a read-only memory (ROM) and the volatile memory may be a random access memory (RAM). The memory 150 described in this embodiment of this application is to include any other suitable type of memories.

In some embodiments, the memory 150 is capable of storing data to support various operations, including examples of programs, modules, and data structures, or their subsets or supersets, as described by examples below.

An operating system 151 includes a system program configured to process various basic system services and perform a hardware-related task, for example, a framework layer, a core library layer, and a driver layer, and is configured to implement various basic services and process a hardware-related task.

A network communication module 152 is configured to reach another computing device through one or more (wired or wireless) network interfaces 120. Exemplary network interfaces 120 include: Bluetooth, wireless compatible authentication (WiFi), a universal serial bus (USB), and the like.

An input processing module 153 is configured to detect one or more user inputs or interactions from one of the one or more input apparatuses 132 and translate the detected input or interaction.

In some embodiments, the apparatus provided in this embodiment of this application may be implemented in a software manner. FIG. 2 illustrates an image processing apparatus 154 stored in a memory 150. The image processing apparatus 154 may be an image processing apparatus in the first terminal 100, and may be software in the form of programs and plug-ins, including the following software modules: a first obtaining module 1541, a first extracting module 1542, a first processing module 1543, and an output module 1544. These modules are logical and therefore can be arbitrarily combined or split according to the functions implemented. The functions of the modules are described below.

In some other embodiments, the apparatus provided in this embodiment of the application may be implemented by using hardware. For example, the apparatus provided in this embodiment of the application may be a processor in a form of a hardware decoding processor, programmed to perform the image processing method provided in the embodiments of the application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

To better understand the method provided in this embodiment of this application, first, the artificial intelligence, the branches of the artificial intelligence, and the application fields, cloud technology, and artificial intelligence cloud services involved in the method provided in this embodiment of this application are described.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning. The directions are described below.

Computer vision (CV) is a science that studies how to use a machine to "see". To be more specific, CV performs recognition, tracking, and measurement on a target using a camera and a computer instead of human eyes, and performs graphics processing, so that the computer processes the target into an image suitable for human eyes to observe, or an image suitable for being transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine learning (ML) is a multi-field interdiscipline, and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. ML and DL usually include technologies such as artificial neural network, belief network, reinforcement learning, transfer learning, and inductive learning.

The cloud technology refers to a hosting technology that unifies a series of resources such as hardware, software, and network in a wide area network or local area network to implement calculation, storage, processing, and sharing of data. The cloud technology is a generic term for a network technology, an information technology, an integration technology, a management platform technology, an application technology, and the like applied based on a cloud computing commercial mode, and can form a resource pool, which is used on demand and is flexible and convenient. The cloud computing technology is to become an important support. Backend services of a technology network system require a huge amount of computing and storage resources, such as video websites, image websites, and more portal websites. Accompanied with the high-level development and application of the Internet industry, every item may have its own identification mark in the future, which needs to be transmitted to a backend system for logical processing. Data at different levels may be processed separately, and various types of industry data require strong system back support, which can only be implemented through cloud computing.

The so-called artificial intelligence cloud services, also referred to as AI as a service (AIaaS), are a mainstream service mode of an artificial intelligence platform at present. An AIaaS platform may split several common AI services and provide independent or packaged services in the cloud. This service mode is similar to opening an AI-themed mall: All developers may access one or more of artificial intelligence services provided by the platform through an API interface, and some senior developers may also use an AI framework and AI infrastructure provided by the platform to deploy and operate their own cloud artificial intelligence services.

The solution provided in this embodiment of this application relates to the computer vision technology of artificial intelligence, machine learning, artificial intelligence cloud service, and other technologies, which are described in the following embodiments.

Figure 3:
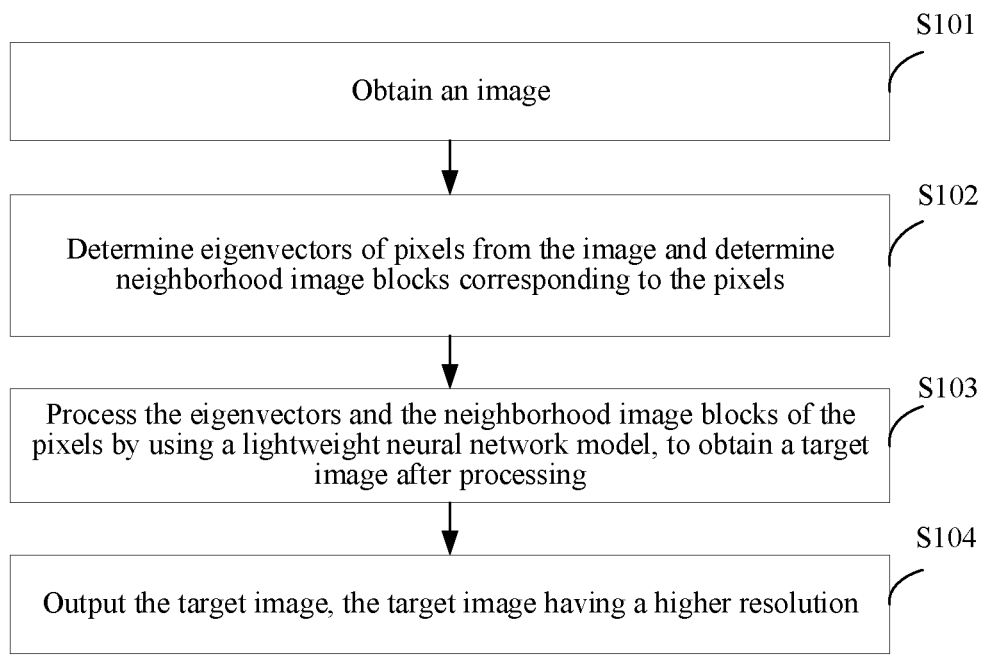
FIG. 3 is a schematic implementation flowchart of an image processing method according to an embodiment of this application.

The following describes the image processing method provided in this embodiment of this application in combination with the exemplary application and implementation of the first terminal 100 provided in this embodiment of this application. The method is performed by an image processing device. The image processing device may be the first terminal shown in FIG. 1A or may be the server shown in FIG. 1B. FIG. 3 is a schematic implementation flowchart of an image processing method according to an embodiment of this application, which is described in combination with steps shown in FIG. 3.

Step S101: Obtain an image.

Here, the image may be a grayscale image or may be a multi-channel color image. In some embodiments, the image may be a video frame image obtained by decoding a video file. The image has a first resolution.

In a case that step S101 is implemented by the first terminal in FIG. 1A, the image may be obtained from a server. In some embodiments, the image may also be an image acquired by a first terminal. In a case that step S101 is implemented by the server in FIG. 1B, the image may be uploaded to a server by a second terminal.

In some embodiments, after the image is obtained in step S101, the following step may also be performed: Determine whether the image is a grayscale image, and when the image is a grayscale image, perform step S102. In a case that the image is a color image, gamut conversion needs to be performed on the image before carrying out the image processing process.

Step S102: Determine eigenvectors of pixels in the image and determine neighborhood image blocks corresponding to the pixels when the image is a grayscale image.

Here, during implementation of step S102, first directional gradient values and second directional gradient values of the pixels may be determined according to pixel values of the pixels in the image and then the eigenvectors of the pixels are determined according to the first directional gradient values and the second directional gradient values of the pixels.

The neighborhood image blocks each may be a K*K image block centered on each pixel, where K is an odd number, for example, K may be 5, 7, 9, 13, or the like.

Step S103: Process the eigenvectors and the neighborhood image blocks of the pixels by using a lightweight neural network model, to obtain a target image after processing.

The lightweight neural network model is obtained by performing lightweight processing on a trained neural network model. In actual implementation, division into subspaces or generation of a decision tree may be performed based on a trained neural network model, to obtain a lightweight neural network model. The lightweight neural network model is more simplified than the neural network model. Therefore, by processing the eigenvectors of the pixels and the neighborhood image blocks using the lightweight neural network model, compared with using the neural network model, the computational efficiency can be improved and the image processing time is shortened, thereby implementing real-time processing.

During implementation of step S103, the subspaces corresponding to the pixels or the leaf nodes in the decision tree corresponding to the pixels may be determined based on the eigenvectors of the pixels, further convolution kernels corresponding to the subspaces or the leaf nodes are determined, the convolution kernels and the neighborhood image blocks are convoluted to obtain processed pixel values of the pixels, and the target image is determined based on the pixel values of the pixels.

Step S104: Output the target image.

Here, when step S104 is implemented by the first terminal shown in FIG. 1A, the target image may be presented in the display device of the first terminal, and when step S104 is implemented by the server shown in FIG. 1B, the target image may be sent to the first terminal. In some embodiments, when step S104 is implemented by the server shown in FIG. 1B, after step S104, the following step is further performed: The server stores the target image to a local storage space. The target image has a second resolution that is higher than the first resolution of the image before the processing.

In the image processing method provided in this embodiment of this application, after obtaining an image, neighborhood image blocks corresponding to the pixels in the image are determined; when the image is a grayscale image, eigenvectors of the pixels in the image are extracted; and the eigenvectors and the neighborhood image blocks of the pixels are processed by using a lightweight neural network model, to obtain a target image after processing, the lightweight neural network model being obtained by performing lightweight processing on a trained neural network model. The neural network structure is used in training and therefore a target image with coherent pixels can be guaranteed after various special losses are used, and the lightweight neural network model (for example, a subspace model or a decision tree) obtained through model conversion is used in image processing and therefore the model can run to output a target image in real time, thereby improving the efficiency of image processing while ensuring the processing effect.

In some embodiments, step S102 "Determine eigenvectors of pixels in the image" may be implemented through the following steps:

Step S1021: Determine a first directional gradient map and a second directional gradient map corresponding to the image.

Here, the first direction may be horizontal, and the second direction may be vertical, and accordingly, during implementation of step S1021, for each pixel in the image, a pixel value of a right adjacent pixel of the pixel is subtracted by a pixel value of a left adjacent pixel thereof to obtain a difference, which is then divided by 2, to obtain the gradient value of the pixel in the first direction, and the first directional gradient map corresponding to the image is determined based on the gradient values of the pixels in the first direction; and a pixel value of a lower adjacent pixel of the pixel is subtracted by a pixel value of an upper adjacent pixel thereof to obtain a difference, which is then divided by 2, to obtain the gradient value of the pixel in the second direction, and the second directional gradient map corresponding to the image is determined based on the gradient values of the pixels in the second direction. For edge pixels in the image, the gradient values may be calculated by the way of edge symmetrical flipping. In this way, vertical gradient values of upper and lower edge pixels in the image are all 0, and horizontal gradient values of left and right edge pixels are all 0. In some embodiments, alternatively, the gradient values of the edge pixels are not calculated, and expansion to edges is performed after a final result is obtained.

Step S1022: Determine first gradient neighborhood blocks in the first directional gradient map and second gradient neighborhood blocks in the second directional gradient map for the pixels in the image.

Here, the first gradient neighborhood blocks and the second gradient neighborhood blocks have the same size and have the same size as the neighborhood image blocks of the pixel in the image.

Step S1023: Determine the eigenvectors of the pixels based on the first gradient neighborhood blocks and the second gradient neighborhood blocks of the pixels.

Here, step S1023 may be implemented by the following steps:

Step S231: Determine covariance matrices of the pixels based on the first gradient neighborhood blocks and the second gradient neighborhood blocks of the pixels.

Here, assuming that a first gradient neighborhood block X and a second gradient neighborhood block Y of a pixel i each are a 5*5 image block, that is, the first gradient neighborhood block and the second gradient neighborhood block each include 25 gradient values, where $X=\{x_1, x_2, \ldots x_{25}\}$, $Y=\{y_1, y_2, \ldots y_{25}\}$, a covariance matrix A of the pixel i may be obtained by using a formula (1-1):

$$A = \begin{pmatrix} \sum_{i=1}^{25} x_i x_i & \sum_{i=1}^{25} x_i y_i \\ \sum_{i=1}^{25} x_i y_i & \sum_{i=1}^{25} y_i y_i \end{pmatrix}. \quad (1-1)$$

As can be seen from the formula (1-1), the covariance matrix is a 2*2 symmetric matrix.

Step S232: Determine first eigenvalues and second eigenvalues corresponding to the covariance matrices.

Here, a first eigenvalue $\lambda_1$ and a second eigenvalue $\lambda_2$ of the covariance matrix A may be calculated according to a formula (1-2) and a formula (1-3):

$$\lambda_1 = \frac{a+c}{2} + \sqrt{b^2 + \left(\frac{a-c}{2}\right)^2} \text{; and} \quad (1\text{-}2)$$

$$\lambda_2 = \frac{a+c}{2} - \sqrt{b^2 + \left(\frac{a-c}{2}\right)^2}$$

$$a = \sum x_i x_i, \ b = \sum x_i y_i, \text{ and } c = \sum y_i y_i. \quad (1\text{-}3).$$

Step S233: Determine variance values corresponding to the neighborhood image blocks of the pixels.

Step S234: Determine the eigenvectors of the pixels based on the first eigenvalues, the second eigenvalues, and the variance values.

Here, in this embodiment of this application, the eigenvectors of the pixels may be 4-dimensional, in this case, during implementation of step S234, there may be a $1^{st}$ dimensional feature $f_1 = \alpha \tan 2(\lambda_1, \lambda_2)$, a $2^{nd}$ dimensional feature $f_2 = \lambda_1$, a $3^{rd}$ dimensional feature $$f_3 = \frac{|\lambda_1 - \lambda_2|}{\lambda_1 + \lambda_2} = \frac{\sqrt{4b^2 + (a-c)^2}}{a+c},$$

and a $4^{th}$ dimensional feature $f_4 = v$, where v is the variance value determined in step S233.

In some embodiments, after the first directional gradient map and the second directional gradient map are determined, the first directional gradient values and the second directional gradient values of the pixels are directly used as the eigenvectors of the pixels. In some embodiments, the eigenvectors of the pixel may also be extracted from the image by using other feature extraction algorithms. However, because model conversion needs to be performed based on the eigenvectors subsequently, no matter which method is used to extract the features of the image, the dimension of the obtained eigenvectors cannot be excessively large, so as to avoid an excessive large quantity of lightweight neural network models obtained after model conversion that further results in an excessively high computational complexity.

In some embodiments, before step S101, a preset neural network model needs to be trained to obtain a trained neural network model through the following steps:

Step S001: Obtain training data and a preset neural network model.

The training data includes at least a first training image and a second training image, and the second training image is obtained by downsampling the first training image, that is, the resolution of the second training image is lower than that of the first training image. In this embodiment of this application, both the first training image and the second training image are grayscale images. In some embodiments, the training data may also include eigenvectors of pixels in the second training image.

The preset neural network model may be a deep learning neural network model, and the neural network model may include a generation model and a discrimination model.

Step S002: Process the second training image by using the neural network model, to obtain a prediction image.

Here, when the training data includes the eigenvectors of the pixels in the second training image, during implementation of step S002, the eigenvectors of the pixels in the second training image are inputted to the neural network model, to obtain the prediction image. In a case that the training data includes only the first training image and the second training image, during implementation of step S002, the second training image is inputted to the neural network model, to obtain the prediction image.

Step S003: Perform back propagation training on the neural network model based on the prediction image, the first training image, and a preset objective function, to obtain the trained neural network model.

Here, the preset objective function includes a generation objective function and a discrimination objective function, and step S003 may be implemented through the following steps:

Step S31: Fix discrimination parameters of the discrimination model, perform back propagation training on the generation model based on the prediction image, the first training image, and the generation objective function, and adjust generation parameters of the generation model.

Step S32: Fix generation parameters of the discrimination model, perform back propagation training on the discrimination model based on the prediction image, the first training image, and the discrimination objective function, and adjust the discrimination parameters of the discrimination model, until a preset training completion condition is reached, to obtain the trained neural network model.

Here, in this embodiment of this application, the preset training completion condition may be that a quantity of times of training reaches a preset quantity threshold, or that a difference between the prediction image and the first training image is less than a preset difference threshold.

In some embodiments, the generation objective function may be constructed through the following steps:

Step S41a: Determine a pixel level error value and a content error value between the prediction image and the first training image.

Here, during determining of the pixel level error value between the prediction image and the first training image, error values between the corresponding pixels in the prediction image and the first training image may be first determined, and then the pixel level error value between the prediction image and the first training image is determined by using the error values between the pixels. The pixel level error value may be an average error calculated according to the error values between the pixels, and may also be a mean square error (MSE), an absolute error, or the like calculated according to the error values between the pixels.

During determining of the content error value between the prediction image and the first training image, the prediction image and the first training image may be inputted to a content feature module separately, to accordingly obtain a prediction content eigenvector and a training content eigenvector. The content feature module is a pretrained module and is generally constructed by using first several layers (it is recommended that first 17 layers are used) of a VGG19. Further, the content error value is calculated based on the prediction content eigenvector and the training content eigenvector. The content error value may be an average error of the prediction content eigenvector and the training content eigenvector or may be in the form of a mean square error, an absolute error, or the like.

Step S42a: Determine a first pixel discrimination error value and a first global discrimination error value of the prediction image based on the prediction image and the discrimination model.

Here, during implementation of step S42a, the prediction image may be inputted to the discrimination model, to obtain a prediction pixel discrimination matrix and a prediction global discrimination value. The size of the prediction pixel discrimination matrix is equal to that of the prediction image, and each element in the prediction pixel discrimination matrix represents a probability at which the pixel at a corresponding position in the prediction image is a generator structure. The prediction global discrimination value is a numerical value and represents a probability at which the prediction image is a generator structure (the numerical value is a real number between 0 and 1). Further, the first pixel discrimination error value is determined based on the prediction pixel discrimination matrix and a NOT value (that is, 0), and the first global discrimination error value is determined based on the prediction global discrimination value and the NOT value. The first pixel discrimination error value may be obtained by calculating an average error of the prediction pixel discrimination matrix and the NOT value, or by calculating a mean square error between the prediction pixel discrimination matrix and the NOT value. Similarly, the first global discrimination error value may be obtained by calculating an average error of the prediction global discrimination value and the NOT value, or by calculating the mean square error between the prediction global discrimination value and the NOT value.

Step S43a: Determine the generation objective function based on a preset generation weight value, the pixel level error value, the content error value, the first pixel discrimination error value, and the first global discrimination error value.

Here, the preset generation weight value includes a first weight value corresponding to the pixel level error value, a second weight value corresponding to the content error value, a third weight value corresponding to the first pixel discrimination error value, and a fourth weight value corresponding to the first global discrimination error value. During implementation of step S43a, the pixel level error value, the content error value, the first pixel discrimination error value, the first global discrimination error value, and the corresponding weight value are weighted and summed, to obtain the generation objective function.

In some embodiments, the discrimination objective function may be constructed through the following steps:

Step S41b: Determine a second pixel discrimination error value and a second global discrimination error value of the prediction image based on the prediction image and the discrimination model.

Here, during implementation of step S41b, firstly, the prediction image is inputted to the discrimination model, to obtain a prediction pixel discrimination matrix and a prediction global discrimination value. Further, the second pixel discrimination error value is determined based on the prediction pixel discrimination matrix and a YES value (that is, 1), and the second global discrimination error value is determined based on the prediction global discrimination value and the YES value. The second pixel discrimination error value may be obtained by calculating an average error of the prediction pixel discrimination matrix and the YES value, or by calculating a mean square error between the prediction pixel discrimination matrix and the YES value. Similarly, the second global discrimination error value may be obtained by calculating an average error of the prediction global discrimination value and the YES value, or by calculating the mean square error between the prediction global discrimination value and the YES value.

Step S42b: Determine a third pixel discrimination error value and a third global discrimination error value of the first training image based on the first training image and the discrimination model.

Here, during implementation of step S42b, firstly, the first training image is inputted to the discrimination model, to obtain a training pixel discrimination matrix and a training global discrimination value. Further, the third pixel discrimination error value is determined based on the training pixel discrimination matrix and a NOT value (that is, 0), and the third global discrimination error value is determined based on the training global discrimination value and the NOT value. The third pixel discrimination error value may be obtained by calculating an average error of the training pixel discrimination matrix and the NOT value, or by calculating a mean square error between the training pixel discrimination matrix and the NOT value. Similarly, the third global discrimination error value may be obtained by calculating an average error of the training global discrimination value and the NOT value, or by calculating the mean square error between the training global discrimination value and the NOT value.

Step S43b: Determine the discrimination objective function based on a preset discrimination weight value, the second pixel discrimination error value, the second global discrimination error value, the third pixel discrimination error value, and the third global discrimination error value.

Here, the preset discrimination weight value includes a fifth weight value corresponding to the second pixel discrimination error value, a sixth weight value corresponding to the second global discrimination error value, a seventh weight value corresponding to the third pixel discrimination error value, and an eighth weight value corresponding to the third global discrimination error value. During implementation of step S43b, the second pixel discrimination error value, the second global discrimination error value, the third pixel discrimination error value, the third global discrimination error, and the corresponding weight values are weighted and summed, to obtain the discrimination objective function.

Figure 4:
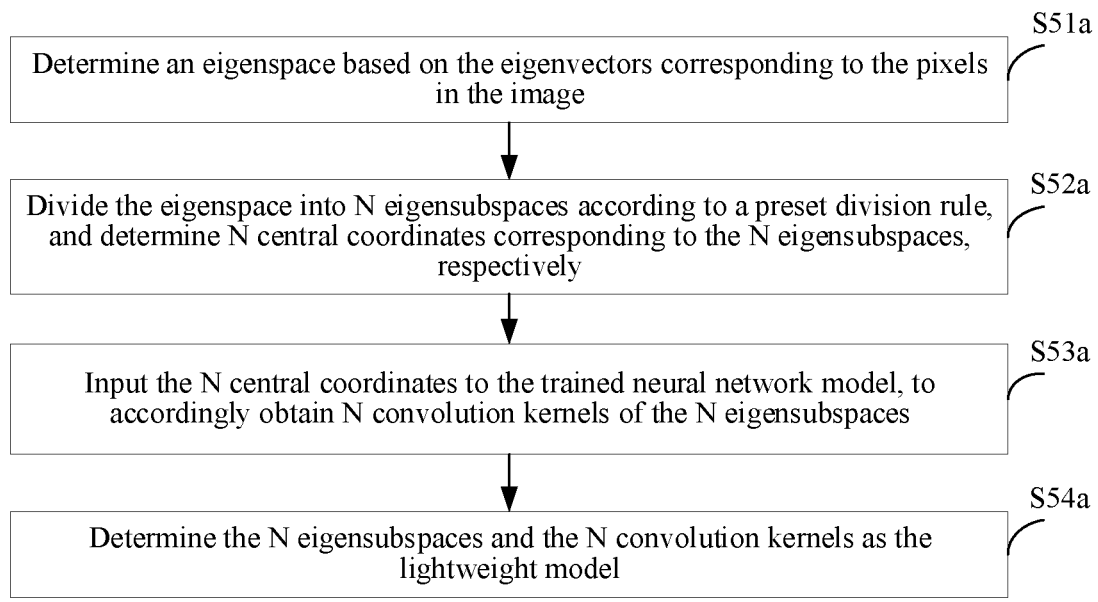
FIG. 4 is a schematic implementation flowchart of obtaining a lightweight neural network model according to an embodiment of this application.

In some embodiments, the lightweight neural network model may be obtained through step S51a to step S54a shown in FIG. 4:

Step S51a: Determine an eigenspace based on the eigenvectors corresponding to the pixels in the image.

Here, the eigenspace may be determined based on maximum value and minimum values in each dimension of the eigenvectors corresponding to the pixels.

Step S52a: Divide the eigenspace into N eigensubspaces according to a preset division rule, and determine N central coordinates corresponding to the N eigensubspaces, respectively.

Here, during implementation of step S52a, dimensions of the eigenvectors may be divided. For example, an eigenvector has four dimensions, each of which is equally divided into eight parts, and therefore 8*8*8*8=4096 eigensubspaces are obtained. Corresponding central coordinates are determined based on maximum and minimum values in the dimensions of each eigensubspace. During implementation, median values of the maximum and minimum values in the dimensions of each eigensubspace may be determined as the central coordinates corresponding to the eigensubspace.

Step S53a: Input the N central coordinates to the trained neural network model respectively, to accordingly obtain N convolution kernels of the N eigensubspaces.

Step S54a: Determine the N eigensubspaces and the N convolution kernels as the lightweight neural network model.

In step S51a to step S54a, the eigenspace is divided to obtain eigensubspaces each having a smaller range and the corresponding convolution kernels of the eigensubspaces are determined, so that the lightweight neural network model is obtained.

In some embodiments, the lightweight neural network model may alternatively be obtained through following steps:

Step S51b: Construct a decision tree based on the eigenvectors corresponding to the pixels in the image.

Here, during implementation of step S51b, firstly, all the eigenvectors may be regarded as one node, and then one eigenvector is selected from all the eigenvectors to divide all the eigenvectors, to generate a plurality of child nodes. For each child node, whether a split stop condition is med is determined, and if yes, the child node is set to a leaf node; and otherwise, one eigenvector is selected from the child node to divide all the eigenvectors in the child node until the split stop condition is met, so that the decision tree is obtained.

Step S52b: Input leaf nodes in the decision tree to the trained neural network model respectively, to accordingly obtain convolution kernels corresponding to the leaf nodes.

Here, inputting the leaf nodes to the trained neural network model means inputting the eigenvectors as the leaf nodes to the trained neural network model, to obtain the convolution kernels corresponding to the leaf nodes.

Step S53b: Determine the leaf nodes and the corresponding convolution kernels as the lightweight neural network model.

In step S51b to step S53b, the decision tree is constructed based on the eigenvectors of the pixels and the convolution kernels corresponding to the leaf nodes in the decision tree are determined, so that the lightweight neural network model is obtained.

After the lightweight neural network model is obtained based on step S51a to step S54a, or after the lightweight neural network model is obtained based on step S51b to step S53b, step S103 "Process the eigenvectors and the neighborhood image blocks of the pixels by using a lightweight neural network model, to obtain a target image after processing" may be implemented through the following steps:

Step S1031: Determine convolution kernels corresponding to the pixels based on the eigenvectors of the pixels and the lightweight neural network model.

Here, when the lightweight neural network model is obtained by dividing the eigenspace to obtain eigensubspaces, during implementation of step S1031, an eigensubspace in the lightweight neural network model and into which an eigenvector of a pixel i falls may be determined based on the eigenvector of the pixel i, to further obtain a convolution kernel corresponding to the eigensubspace. In this embodiment of this application, a quantity of channels of the convolution kernel obtained differs depending on different image processing. For example, when SR processing is performed and an SR multiple is P, where P is an integer greater than 1 (for example, 2), the size of a raw image before processing is W*D (for example, 1280*720), and the size of a processed image is W*P*D*P (for example, the size of the processed image is 1280*2*720*2, that is, 2560*1440), the quantity of channels of the convolution kernel obtained is P*P (that is, 4). In a case that denoising processing is performed, the size of the raw image before processing is equal to that of the processed image, the quantity of channels of the convolution kernel obtained is 1.

Here, when the lightweight neural network model is obtained by constructing a decision tree, during implementation of step S1031, the eigenvectors of the pixels may be compared with the nodes in the decision tree, to finally obtain target leaf nodes corresponding to the pixels and obtain convolution kernels corresponding to the target leaf nodes.

Step S1032: Perform convolution calculation on the neighborhood image blocks of the pixels and the corresponding convolution kernels, to obtain pixel values after processing.

Here, a quantity of pixel values after processing obtained after performing convolution calculation on one pixel value is correlated with a quantity of channels of the convolution kernel. For example, when the quantity of channels of the convolution kernel is 1, the obtained quantity of pixel values after processing is also 1; and when the quantity of channels of the convolution kernel is P*P, the obtained quantity of pixel values after processing is P*P.

Step S1033: Determine, based on the pixel values after processing, the target image after processing.

Here, when a quantity of pixel values after processing is 1, the target image after processing is obtained directly based on the pixel value after processing; and when a quantity of pixel values after processing is P*P, the pixel values after processing need to be spliced and shuffled to obtain the target image after processing.

In the embodiment of step S1031 to step S1033, the convolution kernels corresponding to the pixels are determined by using the lightweight neural network model, the dimensions are reduced compared with convolution kernels corresponding to the neural network model before lightweight processing. Therefore, the amount of calculation of the convolution calculation can be reduced, thereby improving the processing efficiency and implementing real-time processing.

Figure 5:
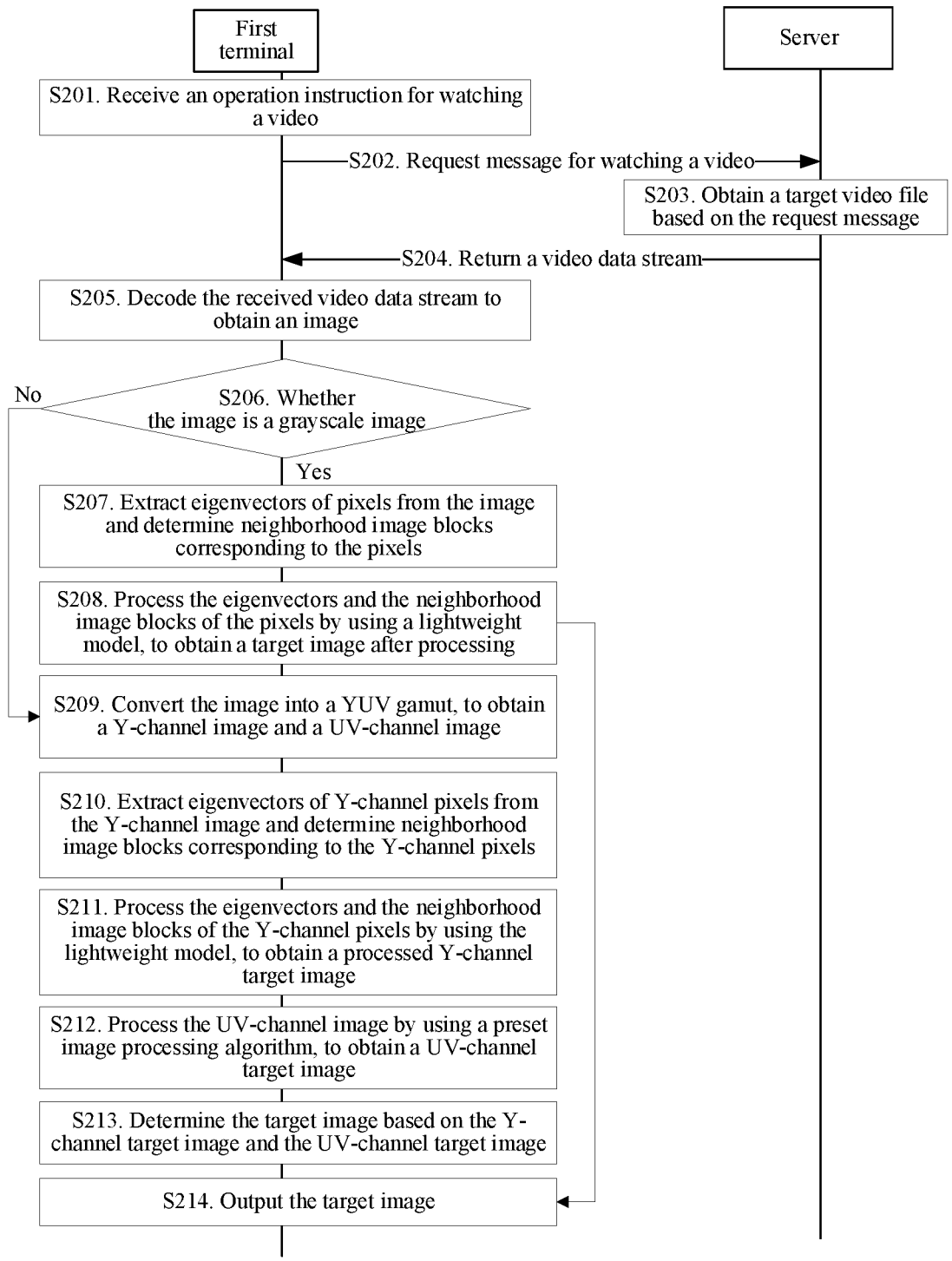
FIG. 5 is a schematic implementation flowchart of an image processing method according to an embodiment of this application.

Based on the foregoing embodiments, an embodiment of this application further provides an image processing method. FIG. 5 is a schematic implementation flowchart of an image processing method according to this embodiment of this application, applied to the network architecture shown in FIG. 1A. As shown in FIG. 5, the method includes the following steps:

Step S201: A first terminal receives an operation instruction for watching a video.

Here, the operation instruction may be triggered by a click or touch operation made by a user at a video watching entrance of a video watching App.

Step S202: The first terminal transmits a request message for watching a video to a server based on the operation instruction.

Here, the request message carries a target video identity.

Step S203: The server obtains a target video file based on the request message.

Here, after receiving the request message, the server parses the request message, obtains the target video identity, and obtains the target video file based on the target video identity.

Step S204: The server returns a video data stream to the first terminal based on the target video file.

Step S205: The first terminal decodes the received video data stream to obtain an image.

Here, during implementation of step S205, the first terminal decodes the received video data stream, obtains video image frames, and determines each video image frame as the image.

Step S206: The first terminal determines whether the image is a grayscale image.

Here, when the image is a grayscale image, perform step S207; and when the image is a color image, perform step S209. In this embodiment of this application, when the image is a color image, the image may be an RGB color image, an sRGB color image, a CMYK color image, or the like.

Step S207: The first terminal determines eigenvectors of pixels in the image and determines neighborhood image blocks corresponding to the pixels.

Step S208: The first terminal processes the eigenvectors and the neighborhood image blocks of the pixels by using a lightweight neural network model, to obtain a target image after processing.

The lightweight neural network model is obtained by performing lightweight processing on a trained neural network model. In actual implementation, division into subspaces or generation of a decision tree may be performed based on a trained neural network model, to obtain a lightweight neural network model.

The implementation processes of step S207 and step S208 in this embodiment of this application are similar to those of step S102 and step S103 in the other embodiments, and can be referred to the implementation processes of step S102 and step S103.

Step S209: The first terminal converts the image into a luminance chrominance (YUV) gamut, to obtain a luminance Y-channel image and a chrominance UV-channel image.

Here, during implementation of step S209, the color image to be processed may be converted into the YUV gamut according to a preset conversion function, to obtain the Y-channel image and the UV-channel image. Y-channel information in the YUV image is enough to indicate a grayscale of the image, that is, the Y-channel image is a single-channel grayscale image.

Step S210: The first terminal determines eigenvectors of Y-channel pixels from the Y-channel image and determines neighborhood image blocks corresponding to the Y-channel pixels.

Here, the implementation process of step S210 is similar to that of step S102, and the implementation process of step S102 can be referred to in actual implementation.

Step S211: The first terminal processes the eigenvectors and the neighborhood image blocks of the Y-channel pixels by using the lightweight neural network model, to obtain a Y-channel target image after processing.

In this embodiment of this application, after the color image to be processed is converted into the YUV gamut, image processing is performed only on the Y-channel image by using the lightweight neural network model, to obtain the Y-channel target image after processing. The implementation process of step S211 is similar to that of step S103, and the implementation process of step S103 can be referred to in actual implementation.

Step S212: The first terminal processes the UV-channel image by using a preset image processing algorithm, to obtain a UV-channel target image.

Here, the preset image processing algorithm differs depending on different image processing purposes. For example, when the purpose of image processing is to improve the image resolution, the preset image processing algorithm may be an image interpolation algorithm, for example, may be a double cubic interpolation algorithm. In a case that the purpose of image processing is to remove image noise, the preset image processing algorithm may be a filtering algorithm, for example, a spatial domain filtering algorithm, a transform domain filtering algorithm, or the like.

Step S213: The first terminal determines the target image based on the Y-channel target image and the UV-channel target image, where a gamut of the target image is the same as that of the image.

Here, after the UV-channel target image is obtained by processing the UV-channel image by using the preset image processing algorithm, in step S213, gamut conversion is performed on the Y-channel target image and the UV-channel target image obtained in step S211, to obtain the target image that has the same gamut as the image.

Step S214: The first terminal outputs the target image.

Here, during implementation of step S214, the target image may be displayed in the display interface of the first terminal.

In the image processing method provided in this embodiment of this application, after obtaining the video data stream from the server, the first terminal decodes the video data stream and obtains the image, and when the image is a grayscale image, the first terminal directly processes the image by using a lightweight neural network model, to obtain the target image; and when the image is a color image, the first terminal converts the image into the YUV gamut, processes the Y-channel image by using a lightweight neural network model to obtain the Y-channel target image, processes the UV-channel image by using a preset image processing algorithm to obtain the UV-channel target image, and further converts the Y-channel target image and the UV-channel target image into a gamut the same as that of the image, to obtain the target image and output the target image, so that the image processing speed can be improved and real-time operation can be implemented (the acceleration ratio after conversion differs depending on different models, which can theoretically reach more than 100 times). The image processing method provided in this embodiment of this application can be used in SR processing, denoising processing, image enhancement processing, and the like, and has a wide application range.

The following describes an exemplary application of this embodiment of this application in an actual application scenario. The image processing method provided in this embodiment of this application may be used in a plurality of image processing applications (for example, image super resolution, denoising, enhancement, and the like), and in this embodiment of this application, for example, used in an image and video super resolution for description.

Figure 6:
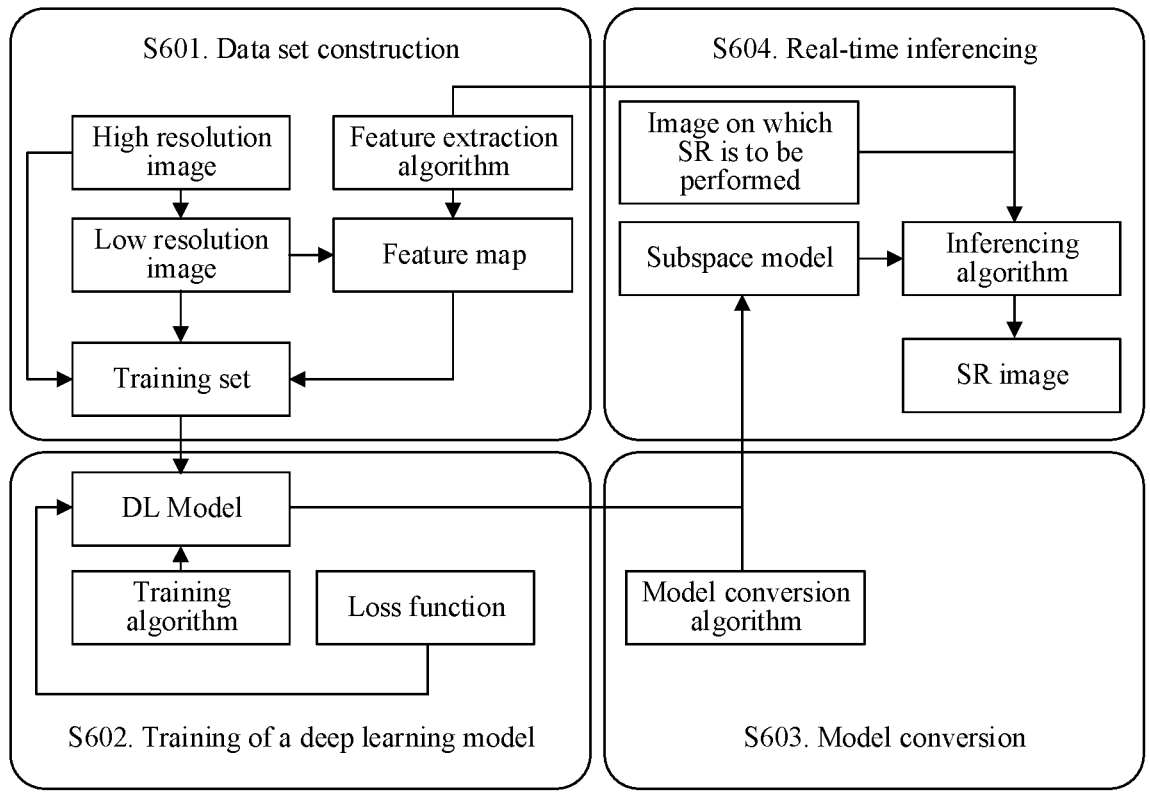
FIG. 6 is a schematic implementation flowchart of an image processing method according to an embodiment of this application.

FIG. 6 is a schematic implementation flowchart of an image processing method according to an embodiment of this application. The method is applied to an image processing device. The image processing device may be the first terminal shown in FIG. 1A or may be the server shown in FIG. 1B. As shown in FIG. 6, the method includes:

Step S601: An image processing device performs training data set construction.

Here, during implementation of step S601, firstly, a high resolution image is downsampled to construct a low resolution image, then features of each pixel in the low resolution image are extracted by using a feature extraction algorithm, to obtain a feature map, and finally, each group of <high resolution image, low resolution image, feature map> is used to construct the training data set.

Step S602: The image processing device trains a deep learning model.

Here, during implementation of step S602, the deep learning model is trained based on the training data set, a training algorithm, and a loss function.

Step S603: The image processing device performs model conversion.

Here, during implementation, a trained deep learning model is simplified to a lightweight neural network model, for example, a subspace model, by using a model conversion algorithm.

Step S604: The image processing device performs real-time inferencing.

Here, during implementation, the lightweight neural network model is used for real-time inferencing. Firstly, features of an image on which SR is to be performed are extracted by using a feature extraction algorithm and then rapid processing is performed, by using a lightweight neural network model (for example, a subspace model), on the extracted features and the image on which SR is to be performed, to obtain an SR image.

Step S601 to step S604 are described below in combination with the accompanying drawings.

Figure 7A:
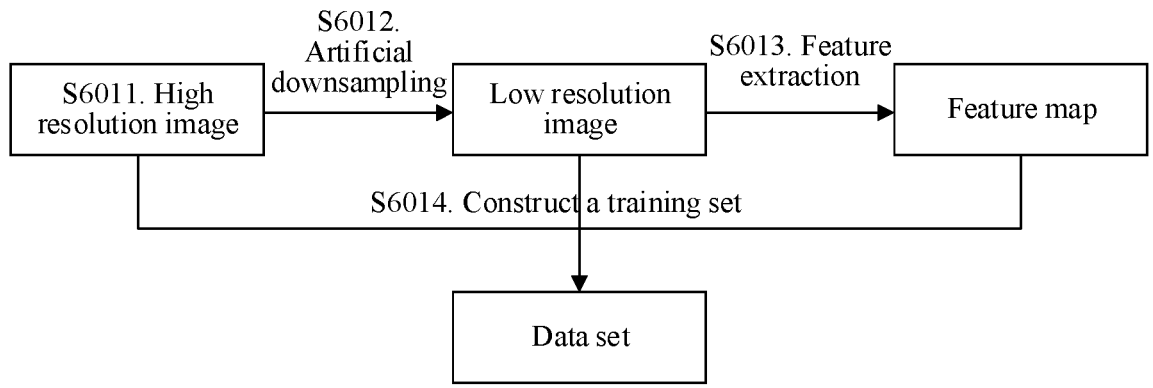
FIG. 7A is a schematic implementation flowchart of constructing a data set according to an embodiment of this application.

Firstly, step S601 "training data set construction" is described. FIG. 7A is a schematic implementation flowchart of constructing a data set according to an embodiment of this application. As shown in FIG. 7A, the implement ion process includes:

Step S6011: Obtain a high resolution image.

Here, the width and height of the high resolution image need to be an integer multiple of the SR multiple N and needs to be a grayscale image.

Step S6012: Reduce the resolution of the high resolution image by using an artificial downsampling algorithm, to obtain a low resolution image.

Here, the high resolution image is scaled by N times by using a manual downsampling method. In this embodiment of this application, the downsampling method may be various methods such as mean filtering and linear difference.

Step S6013: Extract features of the low resolution image by using a feature extraction algorithm, to obtain a feature map.

Step S6014: Form the high resolution image, the low resolution image, and the feature map into a training set.

In this embodiment of this application, during implementation of step S6013, gradient features and variances may be used as the features of the low resolution image, to further construct the feature map. In some embodiments, 4-dimensional features corresponding to each pixel may be calculated for each pixel. Then, a feature map with the quantity of channels being 4 and having the same width and height as the low resolution image is formed according to an order of original pixels.

Figure 7B:
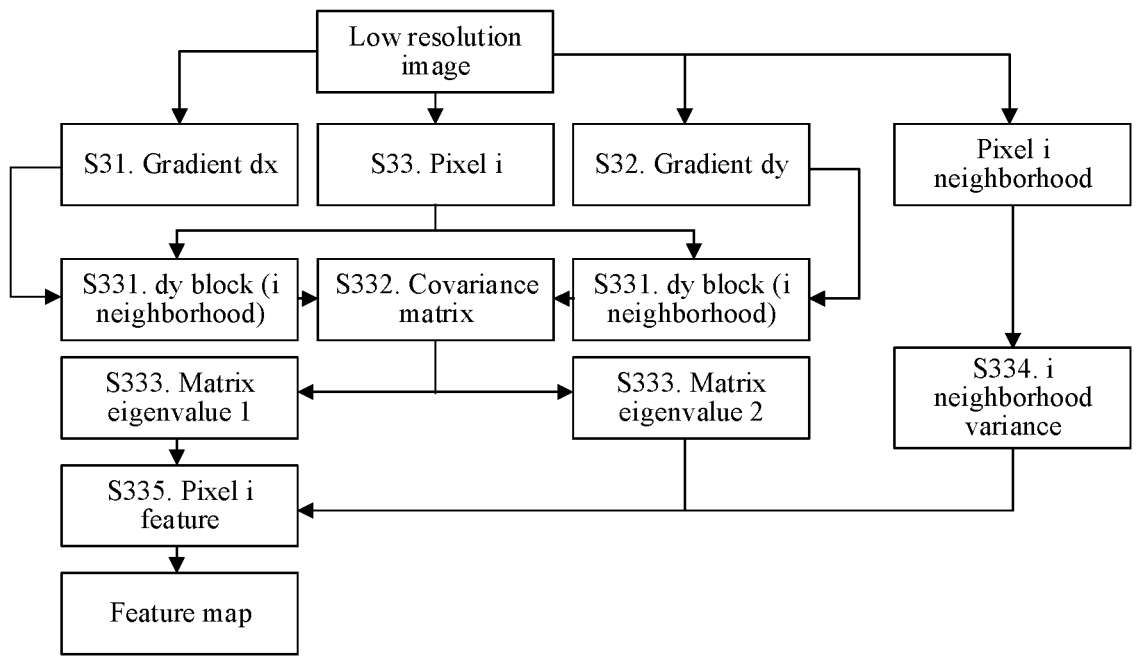
FIG. 7B is a schematic implementation flowchart of extracting features of a low resolution image according to an embodiment of this application.

FIG. 7B is a schematic implementation flowchart of extracting features of a low resolution image according to an embodiment of this application. As shown in FIG. 7B, the process includes:

Step S31: The image processing device calculates a first directional gradient map dx of the low resolution image.

Here, the image processing device may be the first terminal shown in FIG. 1A or may be the server shown in FIG. 1B. During implementation, for each pixel i in a low resolution image, a value of a right pixel is subtracted by a value of a left pixel to obtain a difference, which is then divided by 2, to obtain a corresponding gradient value of the pixel i in the dx.

Step S32: The image processing device calculates a second directional gradient map dy of the low resolution image.

Here, during implementation, for each pixel i in the low resolution image, a value of a lower pixel is subtracted by a value of an upper pixel to obtain a difference, which is then divided by 2, to obtain a corresponding gradient value of the pixel i on the dy.

Step S33: For each pixel i in the low resolution image, the image processing device performs the following processing to obtain corresponding features thereof (the 4-dimensional features are obtained in this embodiment of this application):

Step 331: The image processing device calculates neighborhood image blocks of the pixel I at corresponding positions of dx and dy, which are recorded as x and y, respectively.

Here, x and y correspond to the dx block and the dy block in FIG. 7B.

Step 332: Consider x and y as vectors, record lengths of x and y as M, elements therein being $x_i(i=1, 2, \ldots, M)$ and $y_i(i=1, 2, \ldots, M)$, and calculate a covariance matrix A of x and y, the covariance matrix A being defined as formula (1-1):

$$A = \begin{pmatrix} \sum x_i x_i & \sum x_i y_i \\ \sum x_i y_i & \sum y_i y_i \end{pmatrix}. \quad (1-1)$$

In the formula (1-1), $i=1, 2, \ldots, M$.

Step 333: Calculate eigenvalues $\lambda_1$ and $\lambda_2$ of the covariance matrix A.

Here, the eigenvalues $\lambda_1$ and $\lambda_2$ of the covariance matrix A are calculated according to a formula (1-2) and a formula (1-3), respectively:

$$\lambda_1 = \frac{a+c}{2} + \sqrt{b^2 + \left(\frac{a-c}{2}\right)^2} \text{; and} \quad (1-2)$$

$$\lambda_2 = \frac{a+c}{2} - \sqrt{b^2 + \left(\frac{a-c}{2}\right)^2}$$

$$a = \sum x_i x_i, b = \sum x_i y_i, \text{ and } c = \sum y_i y_i. \quad (1-3).$$

Step 334: Extract a neighborhood image block of a pixel i from the low resolution image and calculate a variance v of the neighborhood image block.

Step 335: Calculate 4-dimensional features of the pixel i.

Here, a $1^{st}$ dimensional feature $f_1 = \text{atan2}(\lambda_1, \lambda_2)$, a $2^{nd}$ dimensional feature $f_2 = \lambda_1$, a $3^{rd}$ dimensional feature $$f_3 = \frac{|\lambda_1 - \lambda_2|}{\lambda_1 + \lambda_2} = \frac{\sqrt{4b^2 + (a-c)^2}}{a+c},$$

and a $4^{th}$ dimensional feature $f_4 = v$.

According to step S31 to step S33, the features of each pixel on the low resolution image are calculated, to construct a feature map.

Figure 8A:
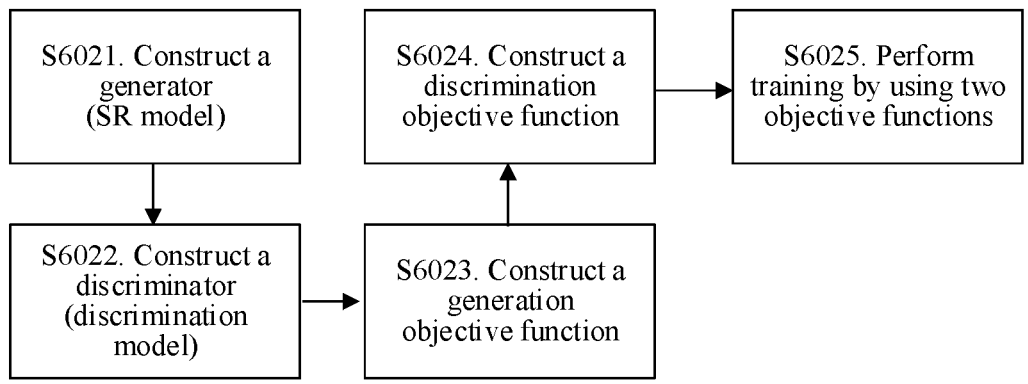
FIG. 8A is a schematic implementation flowchart of a deep learning model and training thereof according to an embodiment of this application.

Then, step S602 "deep learning model and training thereof" is described. FIG. 8A is a schematic implementation flowchart of a deep learning model and training thereof according to an embodiment of this application. As shown in FIG. 8A, the process includes the following steps:

Step S6021: Construct a generator (SR model).
Step S6022: Construct a discriminator (discrimination model).
Step S6023: Construct a generation objective function.
Step S6024: Construct a discrimination objective function.
Step S6025: Train an SR model and a discrimination model by using two objective functions.

Figure 8B:
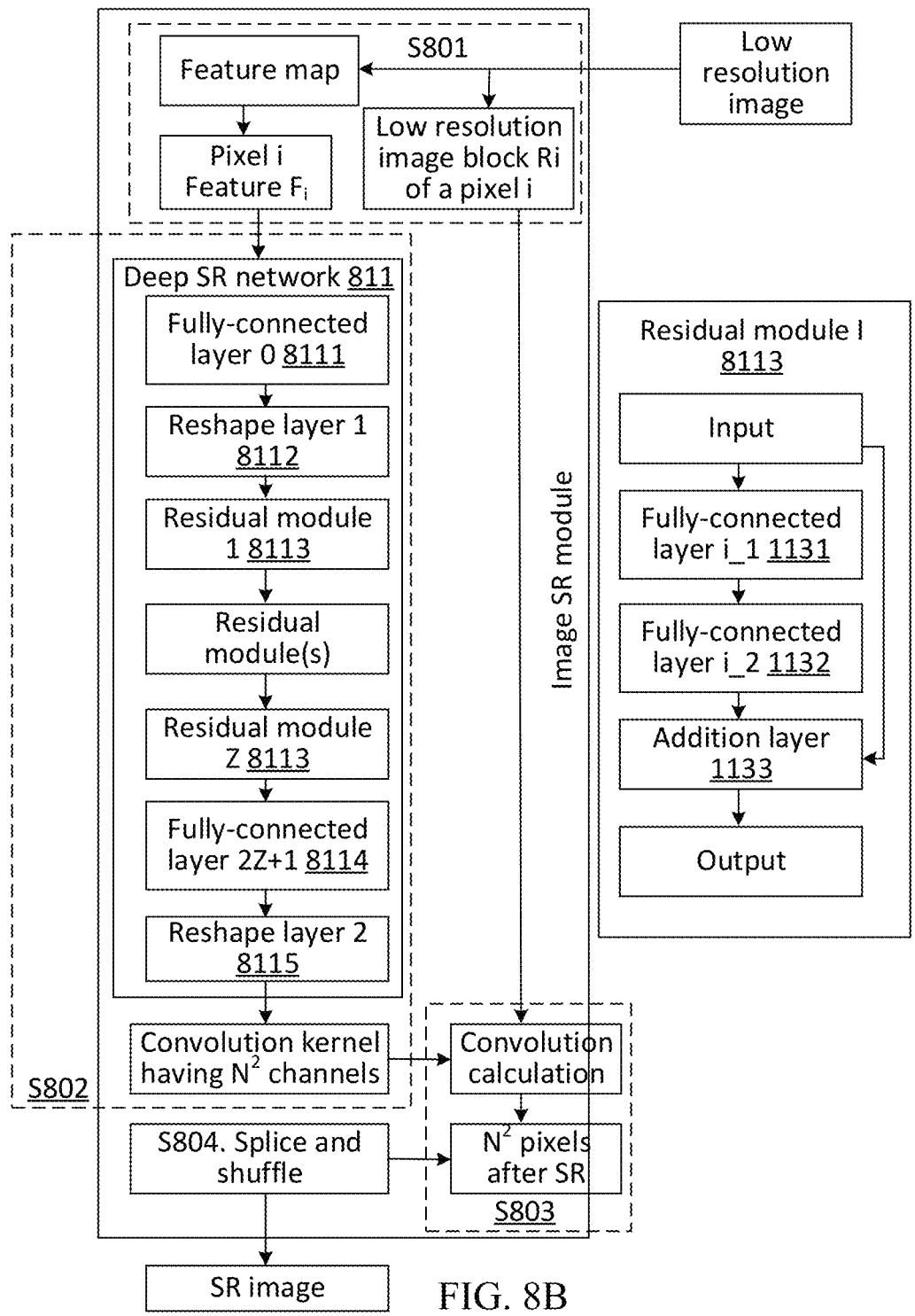
FIG. 8B is a schematic implementation flowchart of an SR network structure and a method for using the network according to an embodiment of this application.

In this embodiment of this application, an available SR network structure and method for using a network are shown in FIG. 8B (the network structure is not limited herein), the available SR network structure is shown by 811 in FIG. 8B.

In this embodiment of this application, a deep SR network is a deep neural network, as shown in FIG. 8B, which includes a fully-connected layer 0 8111, a reshape layer 1 8112, residual modules 1 to Z 8113, and a fully-connected layer 2Z+1 8114, and a reshape layer 2 8115. A residual module i 8113, as shown in FIG. 8B, further includes a fully-connected layer i_1 1131, a fully-connected layer i_2 1132, and an addition layer 1133.

The feature map of the low resolution image is inputted to the deep neural network, which outputs a convolution kernel used for SR of the current image block.

Assuming that the size of the low resolution image is P*P, and the multiple of the SR is N, recommended network parameters are shown in Table 1 below:

TABLE 1

Network parameters of the neural network provided in this embodiment of this application

| Layer name | Output shape | Activation function | Batch standardization |
|---|---|---|---|
| Input | (—, P, P) | None | None |
| Reshape Tier 1 | (—, PP) | None | None |
| Fully-connected layer 0 | (—, 32) | pReLU | None |
| Fully-connected layer i_1 (in residual module i) | (—, 64) | pReLU | None |
| Fully-connected layer i_2 (in residual module i) | (—, 32) | pReLU | Yes |
| Fully-connected layer 2Z + 1 | (—, PPNN) | None | None |
| Reshape layer 2 | (—, P, P, NN) | None | None |

A recommended value of Z is 10 and "—" in the table represents a batch dimension.

As shown in FIG. 8B, a use process of the deep SR network is described below:

Step S801: Extract a low resolution image block $R_i$ and a 4-dimensional feature $F_i$ corresponding to a pixel i from a data set.
Step S802: Input the feature $F_i$ to the deep SR network, to obtain an SR convolution kernel i used for the image block $R_i$.
Step S803: Perform convolution calculation on the image block $R_i$ and the convolution kernel i, to obtain $N^2$ pixels after SR, which are marked as vector $I_i$.
Step S804: After post-SR values $I_i$ of all pixels are calculated, splice and shuffle the pixels (that is, PixelShuffle), to obtain a super resolution image S.

Here, assuming that the width and height of the low resolution image are W and H respectively, the image S obtained by directly combining the pixels after SR is a three-dimensional matrix, the three dimensions are respectively W, H, and $N^2$ with priorities increasing sequentially, where N is the multiple of super resolution.

For example, W is 640, H is 360, N is 2, and the three dimensions of the image S obtained after SR are respectively 640, 360, and 4.

During implementation of step S804, first, the S is reshaped into a 4-dimensional matrix, the dimensions of which respectively are W, H, N, and N (for example, 640, 360, 2, and 2), the second and third dimensions of the S are then exchanged, subsequently, the S is reshaped into a 2-dimensional matrix, the dimensions of which respectively are WN (640*2=1280) and HN (360*2=720), respectively, and the reshaped S is the super resolution image S.

In this embodiment of this application, the convolution kernel outputted by the SR network is a convolution kernel having $N^2$ channels.

The SR network uses the input features, so that the subsequent model conversion steps can run effectively (because the quantity of dimensions of the features used is small, namely, only 4 dimensions).

Figure 8C:
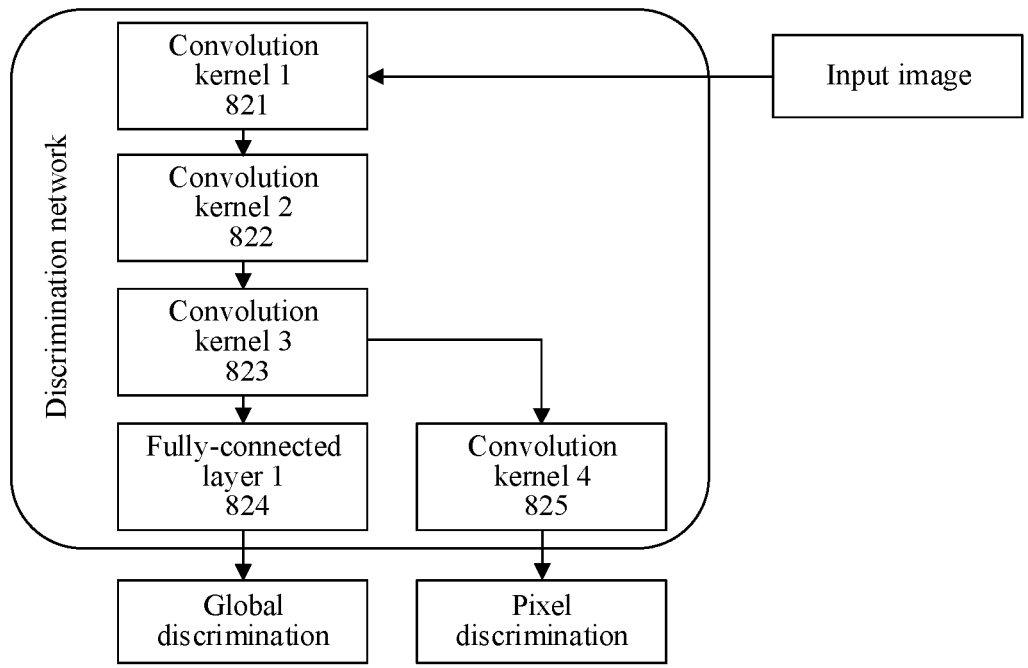
FIG. 8C is a schematic diagram of a network structure of a discriminator according to an embodiment of this application.

FIG. 8C is a schematic diagram of a network structure of a discriminator according to an embodiment of this application. As shown in FIG. 8C, the network model includes a convolution layer 1 821, a convolution layer 2 822, a convolution layer 3 823, a fully connected layer 1 824, and a convolution layer 4 825. Network structure parameters of the discrimination network model shown in FIG. 8C are shown in Table 2 below:

TABLE 2

Reference parameters of the discrimination network model provided in this embodiment of this application

| Layer name | Quantity of channels | Size of the convolution kernel | Stride | Fill | Activation function | Batch standardization |
|---|---|---|---|---|---|---|
| Convolution kernel 1 | 16 | 3 × 3 | 1 | 1 | pReLU | — |
| Convolution kernel 2 | 32 | 3 × 3 | 1 | 1 | pReLU | — |
| Convolution kernel 3 | 32 | 3 × 3 | 1 | 1 | pReLU | — |
| Convolution kernel 4 | 1 | 3 × 3 | 1 | 1 | sigmoid | — |
| Fully-connected layer 1 | 1 | — | — | — | sigmoid | — |

As shown in FIG. 8C, after an image 826 is inputted to a discrimination network, the discrimination network has two outputs: a global discrimination output 827 and a pixel discrimination output 828.

The global discrimination output 827 is used for determining whether the input image is an image constructed by an SR network and the output is a numerical value, which represents a probability that the input image is constructed by a generator (between 0 and 1, 0 represents NOT, and 1 represents YES).

The pixel discrimination output 828 is used for determining whether the input image is an image constructed by an SR network and the output is a matrix having the same width and height as the input image. Each element represents a probability that a pixel at a corresponding position of the input image is constructed by a generator (between 0 and 1, 0 represents NOT, and 1 represents YES).

Figure 8D:
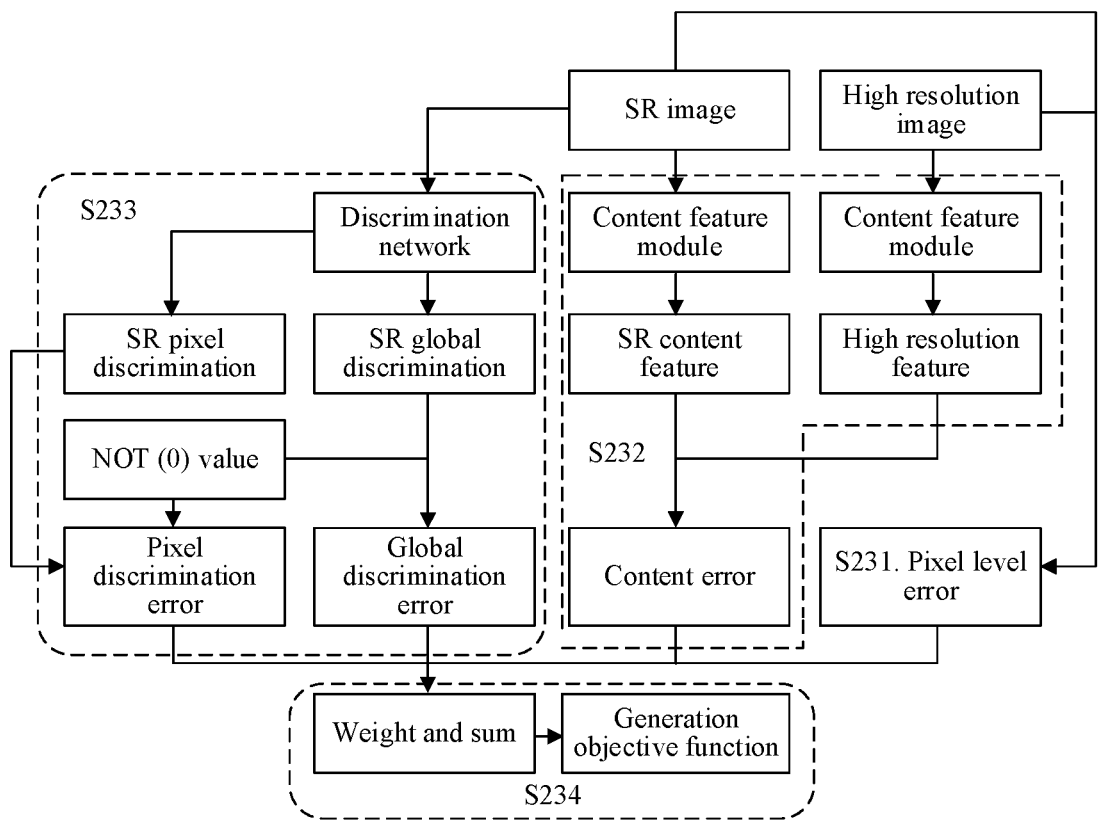
FIG. 8D is a schematic implementation flowchart of constructing a generation objective function according to an embodiment of this application.

In this embodiment of this application, as shown in FIG. 8D, the generation objective function may be constructed:

Step S231: Calculate a pixel level error.

Here, during implementation of step S231, an average error of the pixels between the high resolution image and the SR image is calculated, and the error may be in various forms such as a minimum square error (MSE) and an absolute error.

Step S232: Calculate a content error.

In this embodiment of this application, step S232 may be implemented through the following steps:

Step S2321: Input a high resolution image to a content feature module, to obtain a high resolution content feature.

Here, the content feature module is a pretrained module and is generally constructed by using first several layers (it is recommended that first 17 layers are used) of a VGG19. Other networks or different quantities of first several layers may also be used.

Step S2322: Input an SR image to the content feature module, to obtain an SR content feature.

Step S2323: Calculate an average error of the high resolution content feature and the SR content feature, that is, the content error, where the error may be in various forms such as a minimum square error (MSE) and an absolute error.

Step S233: Calculate a pixel discrimination error and a global discrimination error.

Here, step S233 may be implemented through the following steps:

Step S2331: Input the SR image to the discrimination network, to obtain an SR pixel discrimination and an SR global discrimination.

Step S2332: Calculate an average error of the SR pixel discrimination and a NOT value (0), that is, the pixel discrimination error (it is desired that the generator can deceive the discrimination network and make the discrimination network determine that the pixels of the input image are not obtained through SR).

In this embodiment of this application, the pixel discrimination error may be in various forms such as a binary cross entropy.

Step S2333: Calculate an average error of the SR global discrimination and the NOT value (0), that is, the global discrimination error (it is desired that the generator can deceive the discrimination network and make the discrimination network determine that the input image is not obtained through SR as a whole).

In this embodiment of this application, the global discrimination error may be in various forms such as a binary cross entropy.

Step S234: Weight and sum the four errors, to obtain a generation objective function.

In this embodiment of this application, recommended weights are: a pixel discrimination error weight 7e-4, a global discrimination error weight 3e-4, a content error weight 2e-6, and a pixel level error weight 1.0.

Figure 8E:
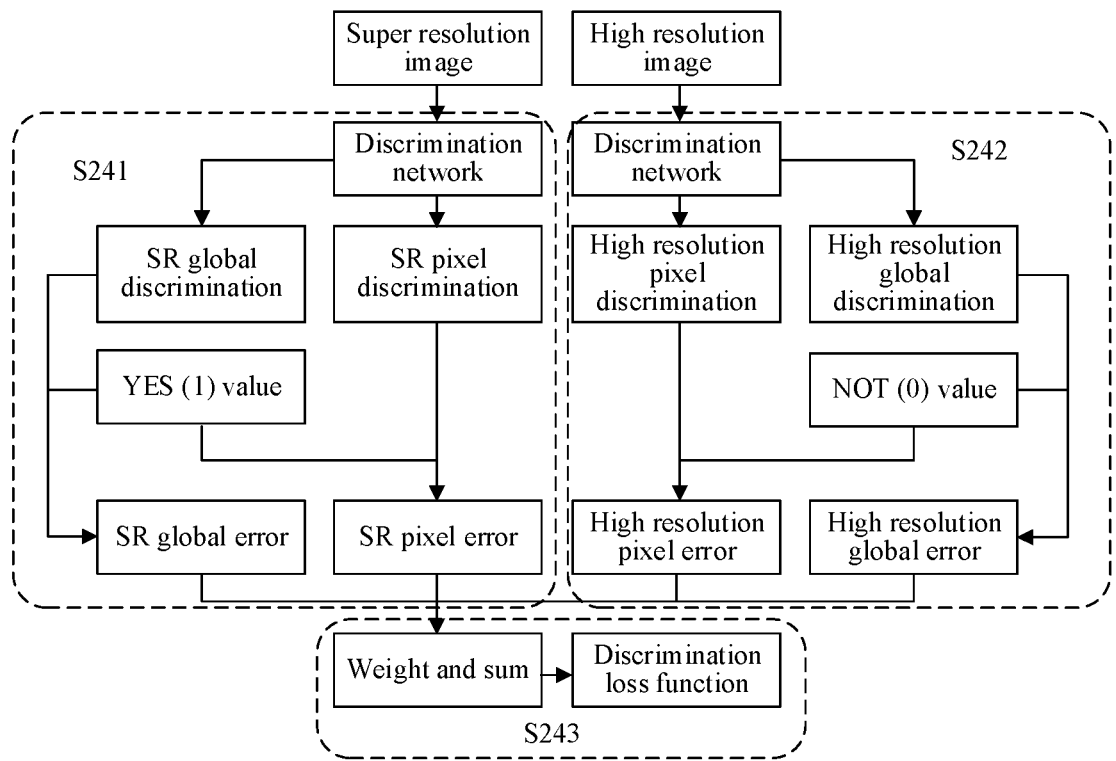
FIG. 8E is a schematic implementation flowchart of constructing a discrimination objective function according to an embodiment of this application.

In this embodiment of this application, the method for constructing the discrimination objective function is shown in FIG. 8E:

Step S241: Calculate an SR global error and an SR pixel error of a super resolution image.

Here, step S241 may be implemented through the following steps:

Step S2411: Input the super resolution image to the discrimination network, to obtain an SR global discrimination and an SR pixel discrimination.

Step S2412: Calculate an average error of the SR pixel discrimination and a YES value (1), that is, the SR pixel error (it is desired that the discrimination network can recognize that each pixel of the input SR image is constructed by an SR module of a generator).

In this embodiment of this application, the SR pixel error may be in various forms such as a binary cross entropy.

Step S2413: Calculate an average error of the SR global discrimination and the YES value (1), that is, the SR global error (it is desired that the discrimination network can recognize that the input SR image is constructed by an SR module of a generator as a whole).

In this embodiment of this application, the SR global error may be in various forms such as a binary cross entropy.

Step S242: Calculate a high resolution global error and a high resolution pixel error of the high resolution image.

Here, step S242 may be implemented through the following steps:

Step S2421: Input the high resolution image to the discrimination network, to obtain a high resolution global discrimination and a high resolution pixel discrimination.

Step S2422: Calculate an average error of the high resolution pixel discrimination and the NOT value (0), that is, the high resolution pixel error (it is desired that the discrimination network can recognize that the each pixel of the input high resolution image is not constructed by an SR module of a generator).

In this embodiment of this application, the high resolution pixel error may be in various forms such as a binary cross entropy.

Step S2423: Calculate an average error of the high resolution global discrimination and the NOT value (0), that is, the high resolution global error (it is desired that the discrimination network can recognize that the input high resolution image is not constructed by an SR module of a generator as a whole).

In this embodiment of this application, the high resolution global error may be in various forms such as a binary cross entropy.

Step S243: Weight and sum the four errors, to obtain a discrimination loss function.

In this embodiment of this application, recommended weights are: a weight of the SR global error is 0.25, a weight of the SR pixel error is 0.25, a weight of the high resolution global error is 0.25, and a weight of the high resolution pixel error is 0.25.

Figure 8F:
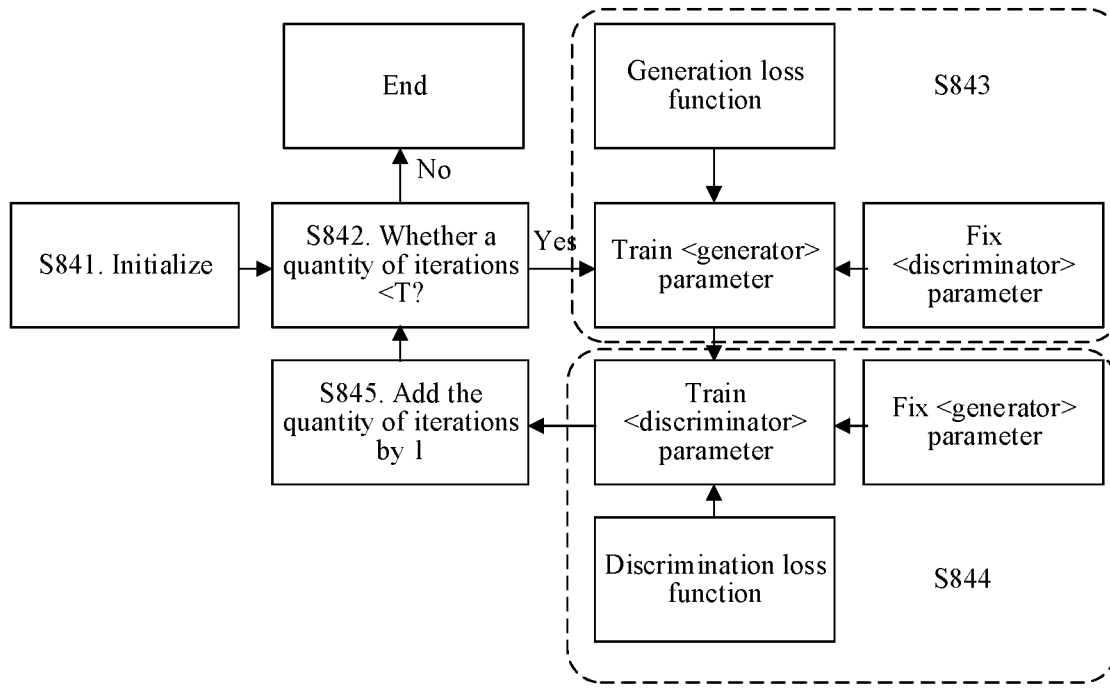
FIG. 8F is a schematic implementation flowchart of model training according to an embodiment of this application.

After the generation model, the discrimination model, the generation loss function, and the discrimination loss function are constructed, it is necessary to train the generation model and discrimination model by using the generation loss function and the discrimination loss function. FIG. 8F is a schematic implementation flowchart of a deep learning model and training thereof according to an embodiment of this application. As shown in FIG. 8F, the process includes the following steps:

Step S841: An image processing device initializes training parameters and model parameters.

Here, a quantity of iterations is initialized to 1, to initialize parameter structures of the discrimination network and the generation network.

Step S842: The image processing devices determines whether the quantity of iterations is less than T.

Here, T is a preset threshold for the quantity of iterations, for example, 10000.

Here, when the quantity of iterations is less than T, step S843 is performed; and when the quantity of iterations is greater than or equal to T, the process is ended.

Step S843: The image processing device fixes parameters of a discriminator and trains (iterates) parameters of a generator once by using an optimal algorithm and using data in a training set and a generation loss function.

Step S844: The image processing device fixes parameters of a generator and trains (iterates) parameters of the discriminator once by using an optimal algorithm and using data in a training set and a discrimination loss function.

Step S845: Add the quantity of iterations by 1 and return back to step S842.

Through step S841 to step S845, trained generator parameters and discriminator parameters may be obtained, the generator parameters are parameters of the deep SR network.

Step S603 "model conversion" is described below. The core idea of model conversion is to approximately sample a deep learning model and convert it into a simple and lightweight neural network model. The following is an example of the method for converting a deep SR network model into a subspace model. Described in one sentence, an input eigenspace is divided to obtain subspaces, and all deep learning output values of each subspace are approximated to output values of a deep learning model corresponding to the central point of the current space.

Figure 9:
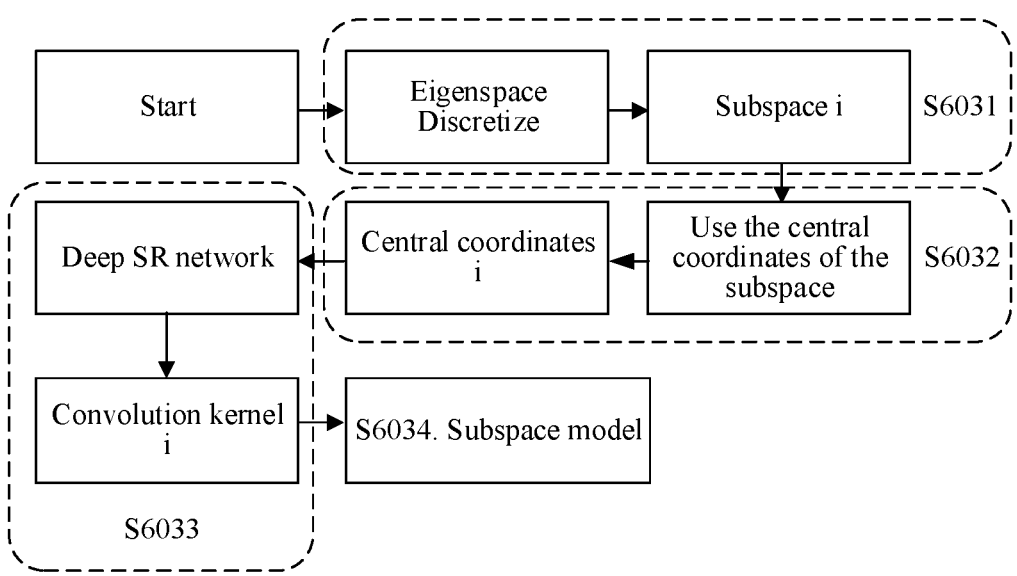
FIG. 9 is a schematic implementation flowchart of model conversion according to an embodiment of this application.

FIG. 9 is a schematic implementation flowchart of a deep learning model and training thereof according to an embodiment of this application. As shown in FIG. 9, the process includes the following steps:

Step S6031: An image processing device discretizes an eigenspace.

Here, during implementation of step S6031, each dimension of the eigenspace (the foregoing 4-dimensional eigenspace) is segmented: a feature 1 is recommended to be evenly divided into $N_1$ (a recommended value is 16) segments from $[0\text{-}2\pi]$; a feature 2 is recommended to be evenly divided into $N_2$ (a recommended value is 8) segments according to maximum and minimum values of data; a feature 3 is recommended to be evenly divided into $N_3$ (a recommended value is 8) segments according to maximum and minimum values of data; and a feature 4 is recommended to evenly divided into $N_4$ (a recommended value is 8) segments from 0 to a maximum value of data. According to the segments, the eigenspace is divided into $N_1*N_2*N_3*N_4$ (a recommended value is 8192) subspaces.

Step S6032: For each subspace i, the image processing device calculates a center of the subspace, that is, central coordinates i.

Here, during implementation of step S6032, median values of upper and lower bounds of each dimension may be calculated respectively, to obtain central coordinates of the subspace.

Step S6033: The image processing device inputs the central coordinates i to a deep SR network, to obtain the convolution kernel i.

Step S6034: The image processing device forms each subspace and corresponding convolution kernel thereof into a converted subspace model.

In the step of model conversion, in addition to being converted into a subspace model, in some embodiments, the deep learning model may also be converted into another lightweight neural network model, such as a decision tree. Such model conversion may be implemented by a method of training a new goal lightweight neural network model using data constructed by a deep learning model.

Figure 10:
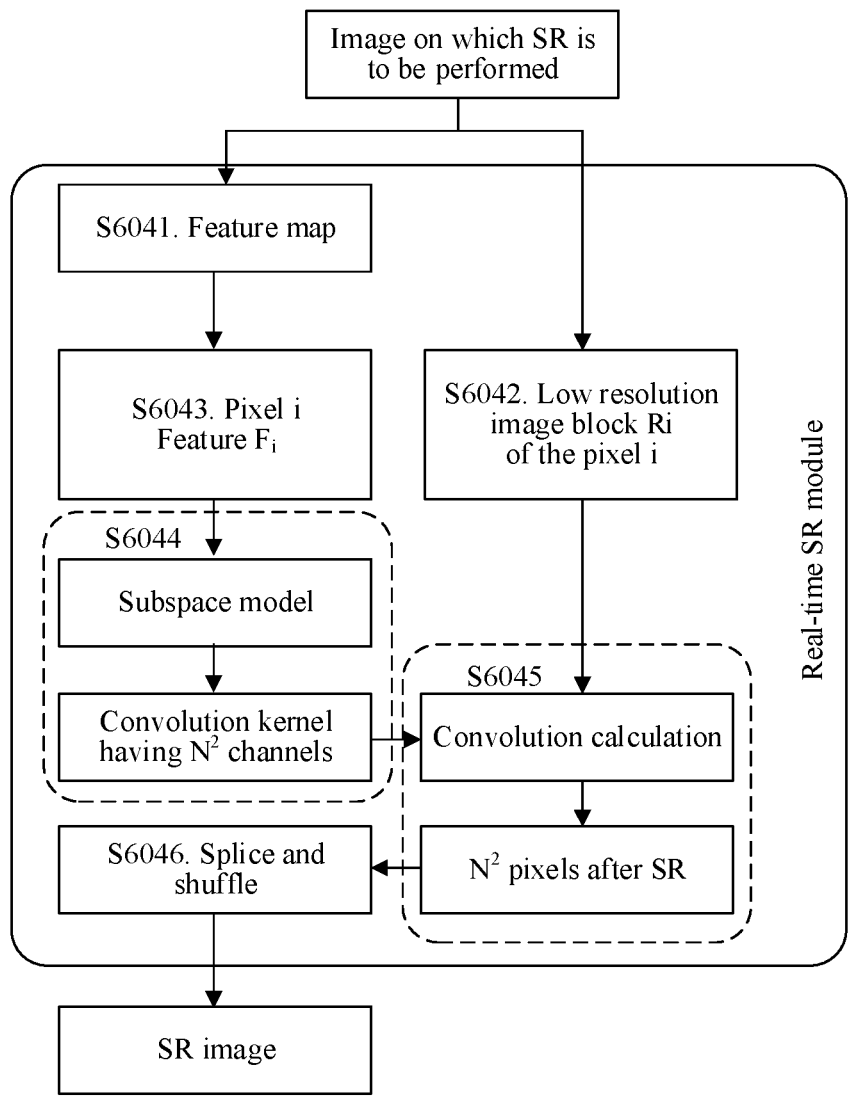
FIG. 10 is a schematic implementation flowchart of real-time inferencing according to an embodiment of this application.

Step S604 "real-time inferencing" is described below. In the step of real-time inferencing, the lightweight neural network model (for example, the subspace model) obtained in step S603 may be used to implement real-time inferencing of SR of an image. FIG. 10 is a schematic implementation flowchart of real-time inferencing according to an embodiment of this application. As shown in FIG. 10, the process includes the following steps:

Step S6041: An image processing device calculates a feature map of an image on which SR is to be performed.

Here, the calculation method is the same as S6013, and the feature extraction algorithm is used to extract the feature map of the image on which SR is to be performed, where the image on which SR is to be performed is a single-channel image.

Step S6042: For each pixel i in the image on which SR is to be performed, the image processing device obtains a low resolution image block $R_i$ of the pixel i from the image on which SR is to be performed.

Step S6043: The image processing device obtains a feature $F_i$ of the pixel i on the feature map.

Step S6044: The image processing device inputs the feature $F_i$ to the subspace model, to query a subspace to which the feature $F_i$ pertains and obtain a convolution kernel i corresponding to the subspace.

Step S6045: The image processing device performs convolution calculation on the low resolution image block $R_i$ and the convolution kernel i corresponding to the determined subspace, to obtain a result $L_i$ after SR is performed on the pixels, that is, to obtain $N^2$ SR pixels after the SR.

Step S6046: The image processing device splices and shuffles all the SR pixels $L_i$ ($N^2$ channels, where N is an SR multiple), to obtain the SR image.

Here, the implementation of the splicing and shuffling method of step S6046 may be referred to the implementation of step S804.

Figure 11:
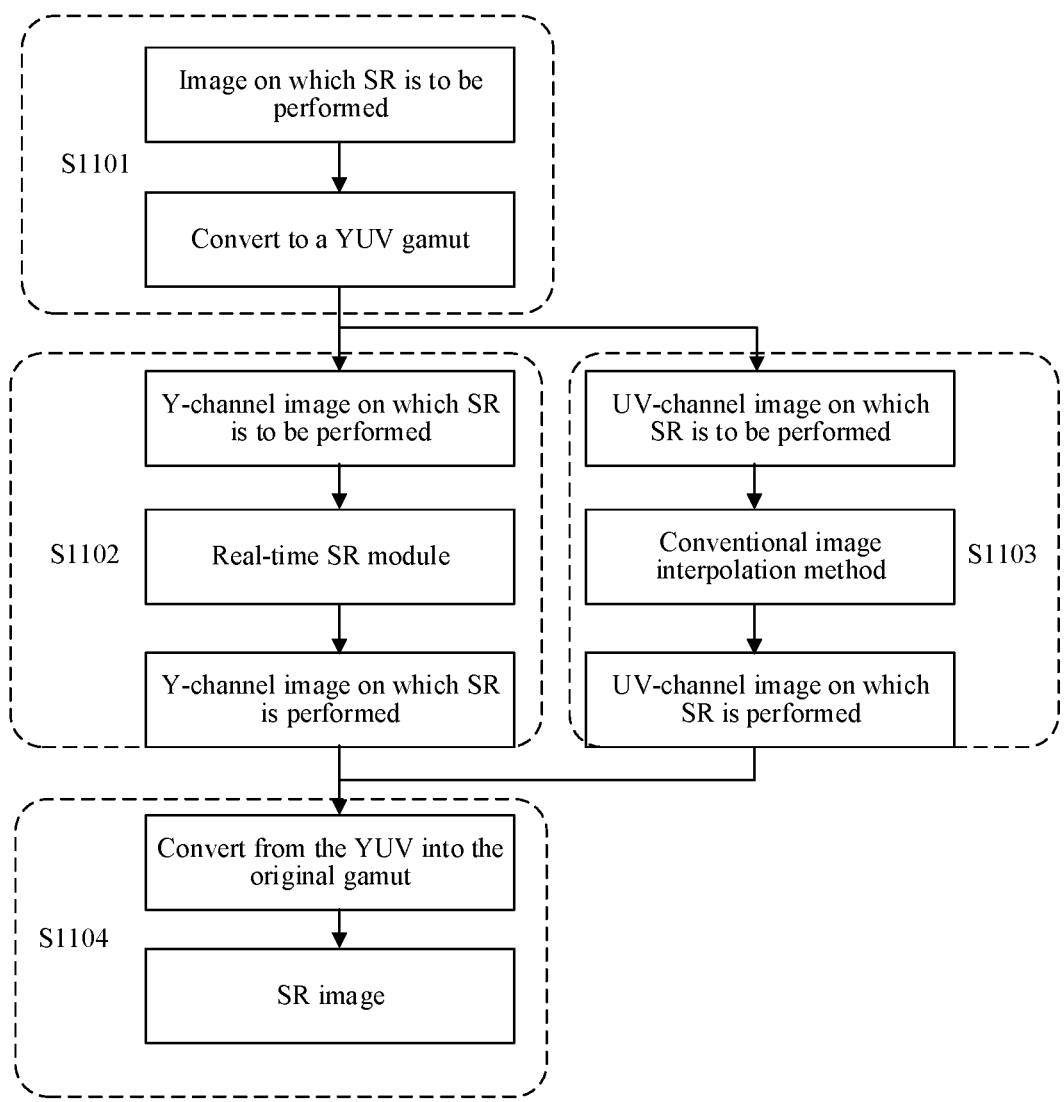
FIG. 11 is a schematic implementation flowchart of performing SR processing on a color image according to an embodiment of this application.

In this embodiment of this application, an image is usually color, and for a color image, an SR image is obtained according to a process shown in FIG. 11:

Step S1101: An image processing device converts a color image from an original gamut (for example, an RGB gamut) to a YUV gamut, to obtain a Y-channel image on which SR is to be performed and a UV-channel image on which SR is to be performed.

Step S1102: The image processing device inputs the Y-channel image on which SR is to be performed to a real-time SR module, so as to perform real-time SR to obtain a Y-channel SR image.

Step S1103: The image processing device performs SR processing on the UV-channel image on which SR is to be performed by using a conventional image interpolation method, to obtain a UV-channel SR image.

In this embodiment of this application, SR processing may be performed by using a double cube interpolation on the UV-channel image on which SR is to be performed, and in some embodiments, other image interpolation methods may also be used.

Step S1104: The image processing device converts the SR YUV image into the original gamut, where the converted image is the SR image.

Figure 12:
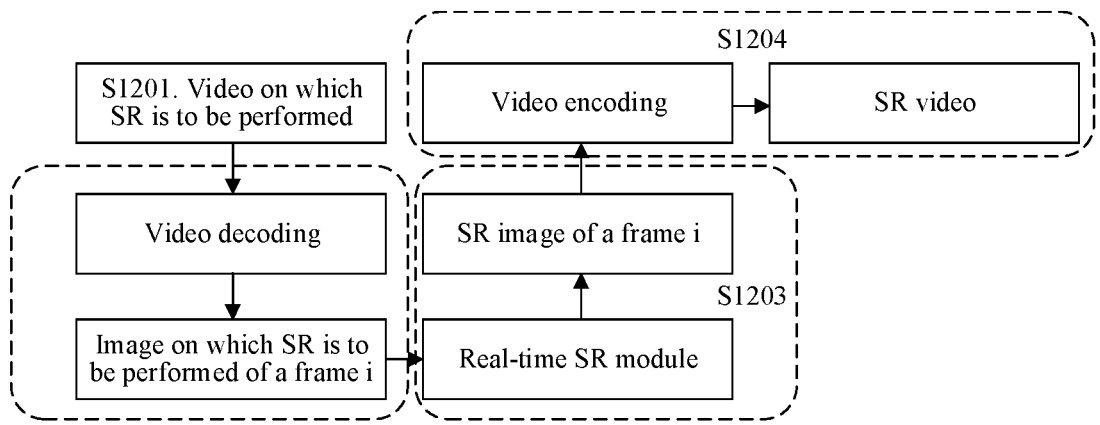
FIG. 12 is a schematic implementation flowchart of performing SR processing on a video according to an embodiment of this application.

In some embodiments, SR processing to be performed on a video file may be implemented through the following steps shown in FIG. 12:

Step S1201: An image processing device obtains a video on which SR is to be performed.

Step S1202: The image processing device decodes the video, to obtain each video frame on which SR is to be performed.

Step S1203: The image processing device inputs each video frame i on which SR is to be performed to a real-time SR module, for SR processing, to obtain an SR image of the video frame i.

Here, when the video frame i on which SR is to be performed is a color image frame, step S1203 may be implemented with reference to step S1101 to step S1104.

Step S1204: The image processing device performs video encoding on SR images of the video frames i, to obtain an SR video.

In the image processing method provided in this embodiments of this application, various objective functions in deep learning may be used during training, which can enable a trained model to have a better image effect and can convert a deep SR model into a lightweight neural network model, thereby greatly improve the inferencing speed and implementing real-time operation (the acceleration ratio after conversion differs depending on different models, which can theoretically reach more than 100 times). Moreover, in addition to the super resolution, the image processing method provided in this embodiment of this application can also be used in other image processing applications, for example, image denoising or enhancement and the like, and has a wide application range.

Figure 13:
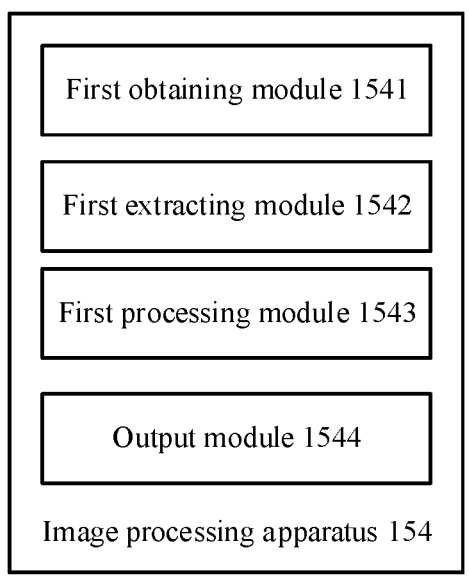
FIG. 13 is a schematic structural diagram of an image processing apparatus according to an embodiment of this application.

The following continues to describe the image processing apparatus 154 provided in this embodiment of this application which is implemented as an exemplary structure of a software module. FIG. 13 is a schematic structural diagram of an image processing apparatus according to an embodiment of this application. As shown in FIG. 13, the image processing apparatus 154 includes:

a first obtaining module 1541, configured to obtain an image;

a first extracting module 1542, configured to determine eigenvectors of pixels in the image and determine neighborhood image blocks corresponding to the pixels in the image when the image is a grayscale image;

a first processing module 1543, configured to process the eigenvectors and the neighborhood image blocks of the pixels by using a lightweight neural network model, to obtain a target image after processing, the lightweight neural network model being obtained by performing lightweight processing on a trained neural network model; and an output module 1544, configured to output the target image.

In some embodiments, the image processing apparatus further includes:

a gamut conversion module, configured to convert the image into a YUV gamut, to obtain a Y-channel image to be processed and a UV-channel image to be processed when the image is a color image;

a second extracting module, configured to determine eigenvectors of Y-channel pixels from the Y-channel image and determine neighborhood image blocks corresponding to the Y-channel pixels;

a second processing module, configured to process the eigenvectors and the neighborhood image blocks of the Y-channel pixels by using the lightweight neural network model, to obtain a Y-channel target image after processing;

a third processing module, configured to process the UV-channel image by using a preset image processing algorithm, to obtain a UV-channel target image; and a first determining module, configured to determine the target image based on the Y-channel target image and the UV-channel target image, where a gamut of the target image is the same as that of the image.

In some embodiments, the first obtaining module is further configured to:

obtain a video file;

decode the video file, to obtain video frame images in the video file; and determine each video frame image as the image.

In some embodiments, the first extracting module is further configured to:

determine a first directional gradient map and a second directional gradient map corresponding to the image;

determine first gradient neighborhood blocks in the first directional gradient map and second gradient neighborhood blocks in the second directional gradient map for the pixels in the image; and determine the eigenvectors of the pixels based on the first gradient neighborhood blocks and the second gradient neighborhood blocks of the pixels.

In some embodiments, the first extracting module is further configured to:

determine covariance matrices of the pixels based on the first gradient neighborhood blocks and the second gradient neighborhood blocks of the pixels;

determine first eigenvalues and second eigenvalues corresponding to the covariance matrices;

determine variance values corresponding to the neighborhood image blocks of the pixels; and determine the eigenvectors of the pixels based on the first eigenvalues, the second eigenvalues, and the variance values.

In some embodiments, the image processing apparatus further includes:

a second obtaining module, configured to obtain training data and a preset neural network model, where the training data includes a first training image and a second training image, the second training image is obtained by downsampling the first training image, and the neural network model includes a generation model and a discrimination model;

a fourth processing module, configured to process the second training image by using the neural network model, to obtain a prediction image; and a model training module, configured to perform back propagation training on the neural network model based on the prediction image, the first training image, and a preset objective function, to obtain the trained neural network model.

In some embodiments, the preset objective function includes a generation objective function and a discrimination objective function. Correspondingly, the model training module is further configured to:

fix discrimination parameters of the discrimination model, perform back propagation training on the generation model based on the prediction image, the first training image, and the generation objective function, and adjust generation parameters of the generation model; and fix generation parameters of the discrimination model, perform back propagation training on the discrimination model based on the prediction image, the first training image, and the discrimination objective function, and adjust the discrimination parameters of the discrimination model, until a preset training completion condition is reached, to obtain the trained neural network model.

In some embodiments, the image processing apparatus further includes:
- a second determining module, configured to determine a pixel level error value and a content error value between the prediction image and the first training image;
- a third determining module, configured to determine a first pixel discrimination error value and a first global discrimination error value of the prediction image based on the prediction image and the discrimination model; and
- a fourth determining module, configured to determine the generation objective function based on a preset generation weight value, the pixel level error value, the content error value, the first pixel discrimination error value, and the first global discrimination error value.

In some embodiments, the image processing apparatus further includes:
- a fifth determining module, configured to determine a second pixel discrimination error value and a second global discrimination error value of the prediction image based on the prediction image and the discrimination model;
- a sixth determining module, configured to determine a third pixel discrimination error value and a third global discrimination error value of the first training image based on the first training image and the discrimination model; and
- a seventh determining module, configured to determine the discrimination objective function based on a preset discrimination weight value, the second pixel discrimination error value, the second global discrimination error value, the third pixel discrimination error value, and the third global discrimination error value.

In some embodiments, the image processing apparatus further includes:
- an eighth determining module, configured to determine an eigenspace based on the eigenvectors corresponding to the pixels in the image;
- a subspace division module, configured to divide the eigenspace into N eigensubspaces according to a preset division rule, and determine N central coordinates corresponding to the N eigensubspaces, respectively;
- a first input module, configured to input the N central coordinates to the trained neural network model respectively, to accordingly obtain N convolution kernels of the N eigensubspaces; and
- a ninth determining module, configured to determine the N eigensubspaces and the N convolution kernels as the lightweight neural network model.

In some embodiments, the image processing apparatus further includes:
- a decision tree constructing module, configured to construct a decision tree based on the eigenvectors corresponding to the pixels in the image;
- a second input module, configured to input leaf nodes in the decision tree to the trained neural network model respectively, to accordingly obtain convolution kernels corresponding to the leaf nodes; and
- a tenth determining module, configured to determine the leaf nodes and the corresponding convolution kernels as the lightweight neural network model.

In some embodiments, the first processing module is further configured to:
- determine convolution kernels corresponding to the pixels based on the eigenvectors of the pixels and the lightweight neural network model;
- perform convolution calculation on the neighborhood image blocks of the pixels and the corresponding convolution kernels, to obtain pixel values of the pixels after processing; and
- determine, based on the pixel values of the pixels after processing, the target image after processing.

The description of the image processing apparatus of the embodiments of this application is similar to that of the above method embodiment and has a beneficial effect similar to that of the method embodiment. For technical details that are not disclosed in the apparatus embodiments of this application, refer to the descriptions of the method embodiments of this application for understanding.

An embodiment of this application provides a computer program product or a computer program. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the image processing method according to the embodiments of this application.

An embodiment of this application provides a storage medium storing an executable instruction. When the executable instruction is executed by a processor, the processor is caused to perform the method in the embodiments of this application.

In some embodiments, the storage medium may be a computer-readable storage medium, for example, memories such as a Ferromagnetic Random Access Memory (FRAM), a Read Only Memory (ROM), a Programmable Read Only Memory (PROM), an Erasable Programmable Read Only Memory (EPROM), an Electrically Erasable Programmable Read Only Memory (EEPROM), a flash memory, a magnetic surface memory, an optical disc, or a Compact Disk-Read Only Memory (CD-ROM); or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts). In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application. In sum, the term "unit"

or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An image processing method, performed by a computer device, the method comprising:
   obtaining an image;
   determining eigenvectors of pixels in the image and determining neighborhood image blocks corresponding to the pixels, further including:
   determining a first directional gradient map and a second directional gradient map corresponding to the image; and
   determining the eigenvectors of the pixels based on values in the first directional gradient map and the second directional gradient map corresponding to the pixels in the image;
   processing the eigenvectors and the neighborhood image blocks of the pixels by using a lightweight neural network model, to obtain a target image after processing, the lightweight neural network model being obtained by performing lightweight processing on a trained neural network model; and
   outputting the target image, wherein the target image has a higher resolution than that of the image.

2. The method according to claim 1, wherein the method further comprises:
   converting the image into a luminance chrominance YUV gamut, to obtain a luminance Y-channel image and a chrominance UV-channel image when the image is a color image;
   determining eigenvectors of Y-channel pixels in the Y-channel image and determining neighborhood image blocks corresponding to the Y-channel pixels;
   processing the eigenvectors and the neighborhood image blocks of the Y-channel pixels by using the lightweight neural network model, to obtain a Y-channel target image after processing;
   processing the UV-channel image by using a preset image processing algorithm, to obtain a UV-channel target image; and
   determining the target image based on the Y-channel target image and the UV-channel target image, wherein a gamut of the target image is the same as that of the image.

3. The method according to claim 1, wherein the obtaining an image comprises:
   obtaining a video file;
   decoding the video file, to obtain video frame images in the video file; and
   determining each video frame image as the image.

4. The method according to claim 1, wherein the determining the eigenvectors of the pixels based on values in the first directional gradient map and the second directional gradient map corresponding to the pixels in the image comprises:
   determining first gradient neighborhood blocks in the first directional gradient map and second gradient neighborhood blocks in the second directional gradient map for the pixels in the image; and
   determining the eigenvectors of the pixels based on values in the first gradient neighborhood blocks and the second gradient neighborhood blocks of the pixels.

5. The method according to claim 4, wherein the determining the eigenvectors of the pixels based on the first gradient neighborhood blocks and the second gradient neighborhood blocks of the pixels comprises:
   determining covariance matrices of the pixels based on the first gradient neighborhood blocks and the second gradient neighborhood blocks of the pixels;
   determining first eigenvalues and second eigenvalues corresponding to the covariance matrices;
   determining variance values corresponding to the neighborhood image blocks of the pixels; and
   determining the eigenvectors of the pixels based on the first eigenvalues, the second eigenvalues, and the variance values.

6. The method according to claim 1, wherein the method further comprises:
   obtaining training data and a preset neural network model, wherein the training data comprises a first training image and a second training image, the second training image is obtained by downsampling the first training image, and the preset neural network model comprises a generation model and a discrimination model;
   processing the second training image by using the neural network model, to obtain a prediction image; and
   performing back propagation training on the preset neural network model based on the prediction image, the first training image, and a preset objective function, to obtain the trained neural network model.

7. The method according to claim 6, wherein the preset objective function comprises a generation objective function and a discrimination objective function, and the performing back propagation training on the neural network model based on the prediction image, the first training image, and a preset objective function, to obtain the trained neural network model comprises:
   fixing discrimination parameters of the discrimination model, performing back propagation training on the generation model based on the prediction image, the first training image, and the generation objective function, and adjusting generation parameters of the generation model; and
   fixing generation parameters of the discrimination model, performing back propagation training on the discrimination model based on the prediction image, the first training image, and the discrimination objective function, and adjusting the discrimination parameters of the discrimination model, until a preset training completion condition is reached, to obtain the trained neural network model.

8. The method according to claim 7, wherein the method further comprises:
   determining a pixel level error value and a content error value between the prediction image and the first training image;
   determining a first pixel discrimination error value and a first global discrimination error value of the prediction image based on the prediction image and the discrimination model; and
   determining the generation objective function based on a preset generation weight value, the pixel level error value, the content error value, the first pixel discrimination error value, and the first global discrimination error value.

9. The method according to claim 7, wherein the method further comprises:
determining a second pixel discrimination error value and a second global discrimination error value of the prediction image based on the prediction image and the discrimination model;
determining a third pixel discrimination error value and a third global discrimination error value of the first training image based on the first training image and the discrimination model; and
determining the discrimination objective function based on a preset discrimination weight value, the second pixel discrimination error value, the second global discrimination error value, the third pixel discrimination error value, and the third global discrimination error value.

10. The method according to claim 1, wherein the method further comprises:
determining an eigenspace based on the eigenvectors corresponding to the pixels in the image;
dividing the eigenspace into N eigensubspaces according to a preset division rule, and determining N central coordinates corresponding to the N eigensubspaces, respectively, wherein Nis an integer greater than 2;
inputting the N central coordinates to the trained neural network model respectively, to accordingly obtain N convolution kernels of the N eigensubspaces; and
determining the N eigensubspaces and the N convolution kernels as the lightweight neural network model.

11. The method according to claim 1, wherein the method further comprises:
constructing a decision tree based on the eigenvectors corresponding to the pixels in the image;
inputting leaf nodes in the decision tree to the trained neural network model respectively, to accordingly obtain convolution kernels corresponding to the leaf nodes; and
determining the leaf nodes and the corresponding convolution kernels as the lightweight neural network model.

12. The method according to claim 1, wherein the processing the eigenvectors and the neighborhood image blocks of the pixels by using a lightweight neural network model, to obtain a target image after processing comprises:
determining convolution kernels corresponding to the pixels based on the eigenvectors of the pixels and the lightweight neural network model;
performing convolution calculation on the neighborhood image blocks of the pixels and the corresponding convolution kernels, to obtain pixel values of the pixels after processing; and
determining, based on the pixel values of the pixels after processing, the target image after processing.

13. A computer device, comprising:
a memory, configured to store executable instructions; and
a processor, configured to implement, when executing the executable instructions stored in the memory, an image processing method including:
obtaining an image;
determining eigenvectors of pixels in the image and determining neighborhood image blocks corresponding to the pixels, further including:
determining a first directional gradient map and a second directional gradient map corresponding to the image; and
determining the eigenvectors of the pixels based on values in the first directional gradient map and the second directional gradient map corresponding to the pixels in the image;
processing the eigenvectors and the neighborhood image blocks of the pixels by using a lightweight neural network model, to obtain a target image after processing, the lightweight neural network model being obtained by performing lightweight processing on a trained neural network model; and
outputting the target image, wherein the target image has a higher resolution than that of the image.

14. The computer device according to claim 13, wherein the method further comprises:
converting the image into a luminance chrominance YUV gamut, to obtain a luminance Y-channel image and a chrominance UV-channel image when the image is a color image;
determining eigenvectors of Y-channel pixels in the Y-channel image and determining neighborhood image blocks corresponding to the Y-channel pixels;
processing the eigenvectors and the neighborhood image blocks of the Y-channel pixels by using the lightweight neural network model, to obtain a Y-channel target image after processing;
processing the UV-channel image by using a preset image processing algorithm, to obtain a UV-channel target image; and
determining the target image based on the Y-channel target image and the UV-channel target image, wherein a gamut of the target image is the same as that of the image.

15. The method according to claim 1 computer device according to claim 13, wherein the obtaining an image comprises:
obtaining a video file;
decoding the video file, to obtain video frame images in the video file; and
determining each video frame image as the image.

16. The computer device according to claim 13, wherein the determining the eigenvectors of the pixels based on values in the first directional gradient map and the second directional gradient map corresponding to the pixels in the image comprises:
determining first gradient neighborhood blocks in the first directional gradient map and second gradient neighborhood blocks in the second directional gradient map for the pixels in the image; and
determining the eigenvectors of the pixels based on values in the first gradient neighborhood blocks and the second gradient neighborhood blocks of the pixels.

17. The computer device according to claim 13, wherein the method further comprises:
determining an eigenspace based on the eigenvectors corresponding to the pixels in the image;
dividing the eigenspace into N eigensubspaces according to a preset division rule, and determining N central coordinates corresponding to the N eigensubspaces, respectively, wherein Nis an integer greater than 2;
inputting the N central coordinates to the trained neural network model respectively, to accordingly obtain N convolution kernels of the N eigensubspaces; and
determining the N eigensubspaces and the N convolution kernels as the lightweight neural network model.

18. The computer device according to claim 13, wherein the method further comprises:
- constructing a decision tree based on the eigenvectors corresponding to the pixels in the image;
- inputting leaf nodes in the decision tree to the trained neural network model respectively, to accordingly obtain convolution kernels corresponding to the leaf nodes; and
- determining the leaf nodes and the corresponding convolution kernels as the lightweight neural network model.

19. The computer device according to claim 13, wherein the processing the eigenvectors and the neighborhood image blocks of the pixels by using a lightweight neural network model, to obtain a target image after processing comprises:
- determining convolution kernels corresponding to the pixels based on the eigenvectors of the pixels and the lightweight neural network model;
- performing convolution calculation on the neighborhood image blocks of the pixels and the corresponding convolution kernels, to obtain pixel values of the pixels after processing; and
- determining, based on the pixel values of the pixels after processing, the target image after processing.

20. A non-transitory computer-readable storage medium, storing executable instructions, the instructions when being executed by a processor of a computer device, causing the computer device to implement an image processing method including:
- obtaining an image;
- determining eigenvectors of pixels in the image and determining neighborhood image blocks corresponding to the pixels, further including:
  - determining a first directional gradient map and a second directional gradient map corresponding to the image; and
  - determining the eigenvectors of the pixels based on values in the first directional gradient map and the second directional gradient map corresponding to the pixels in the image;
- processing the eigenvectors and the neighborhood image blocks of the pixels by using a lightweight neural network model, to obtain a target image after processing, the lightweight neural network model being obtained by performing lightweight processing on a trained neural network model; and
- outputting the target image, wherein the target image has a higher resolution than that of the image.

* * * * *